United States Patent
Shattil

(10) Patent No.: US 7,317,750 B2
(45) Date of Patent: Jan. 8, 2008

(54) ORTHOGONAL SUPERPOSITION CODING FOR DIRECT-SEQUENCE COMMUNICATIONS

(75) Inventor: Steve J Shattil, Boulder, CO (US)

(73) Assignee: Lot 41 Acquisition Foundation, LLC, Wilmington, DE (US)

( * ) Notice: Subject to any disclaimer, the term of this patent is extended or adjusted under 35 U.S.C. 154(b) by 719 days.

(21) Appl. No.: 10/414,663

(22) Filed: Apr. 16, 2003

(65) Prior Publication Data
US 2004/0086027 A1 May 6, 2004

Related U.S. Application Data

(60) Provisional application No. 60/422,670, filed on Oct. 31, 2002.

(51) Int. Cl.
*H04B 1/00* (2006.01)
(52) U.S. Cl. .................................. 375/146; 375/295
(58) Field of Classification Search ................ 375/146
See application file for complete search history.

(56) References Cited

U.S. PATENT DOCUMENTS

| | | | | |
|---|---|---|---|---|
| 6,504,862 B1 * | 1/2003 | Yang | ........................... | 375/146 |
| 6,526,105 B1 * | 2/2003 | Harikumar et al. | ......... | 375/350 |
| 6,687,511 B2 * | 2/2004 | McGowan et al. | ......... | 455/522 |
| 6,859,506 B1 * | 2/2005 | McCorkle | .................... | 375/346 |
| 7,031,371 B1 * | 4/2006 | Lakkis | ........................ | 375/146 |
| 7,082,153 B2 * | 7/2006 | Balachandran et al. | ..... | 375/138 |
| 2004/0057501 A1 * | 3/2004 | Balachandran et al. | ..... | 375/146 |

OTHER PUBLICATIONS

Natarajan, "Throughput enhancement in TDMA through carrier interferometry pulse shaping", 52nd Vehicular Technology Conference, 2000. IEEE VTS-Fall VTC 2000. vol. 4, Sep. 24-28, 2000 pp. 1799-1803 vol. 4.*

Wiegandt, "Peak-to-average power reduction in high-performance, high-throughput OFDM via pseudo-orthogonal carrier-interferometry coding", IEEE Pacific Rim Conference on Communications, Computers and signal Processing, 2001. PACRIM. 2001 vol. 2, Aug. 26-28, 2001 pp. 453-456 vol. 2.*

Natarajan, "Innovative pulse shaping for high-performance wireless TDMA", IEEE Communications Letters, vol. 5, Issue 9, Sep. 2001 pp. 372-374.*

Zhiqiang, "Ultra wideband DS-CDMA via innovations in chip shaping", IEEE VTS 54th Vehicular Technology Conference, 2001. VTC 2001 Fall. vol. 4, Oct. 7-11, 2001 pp. 2470-2474 vol. 4.*

Natarajan, "Crest factor considerations in MC-CDMA with carrier interferometry codes", PACRIM. 2001 IEEE Communications Pacific Rim Conference on Computers and signal Processing, 2001, vol. 2, Aug. 26-28, 2001 pp. 445-448 vol. 2.*

Wiegandt, "Overcoming peak-to-average power ratio issues in OFDM via carrier-interferometry codes", IEEE VTS 54th Vehicular Technology Conference, 2001, VTC 2001 Fall, vol. 2, Oct. 7-11, 2001 pp. 660-663 vol. 2.*

* cited by examiner

*Primary Examiner*—Mohammed Ghayour
*Assistant Examiner*—Juan Alberto Torres
(74) *Attorney, Agent, or Firm*—Connolly Bove Lodge & Hutz LLP

(57) ABSTRACT

An adaptation to Carrier Interferometry synthesis and analysis provides for complex coding and decoding in a sliding window transform. Coding and decoding functionality can be extended to spatial processing in systems employing multiple transceiver elements. Poly-amplitude codes permit successive interference cancellation in spatial and frequency-domain processing. Handoffs in cellular systems are facilitated by selecting spectral/base station combinations that optimize link performance.

14 Claims, 20 Drawing Sheets

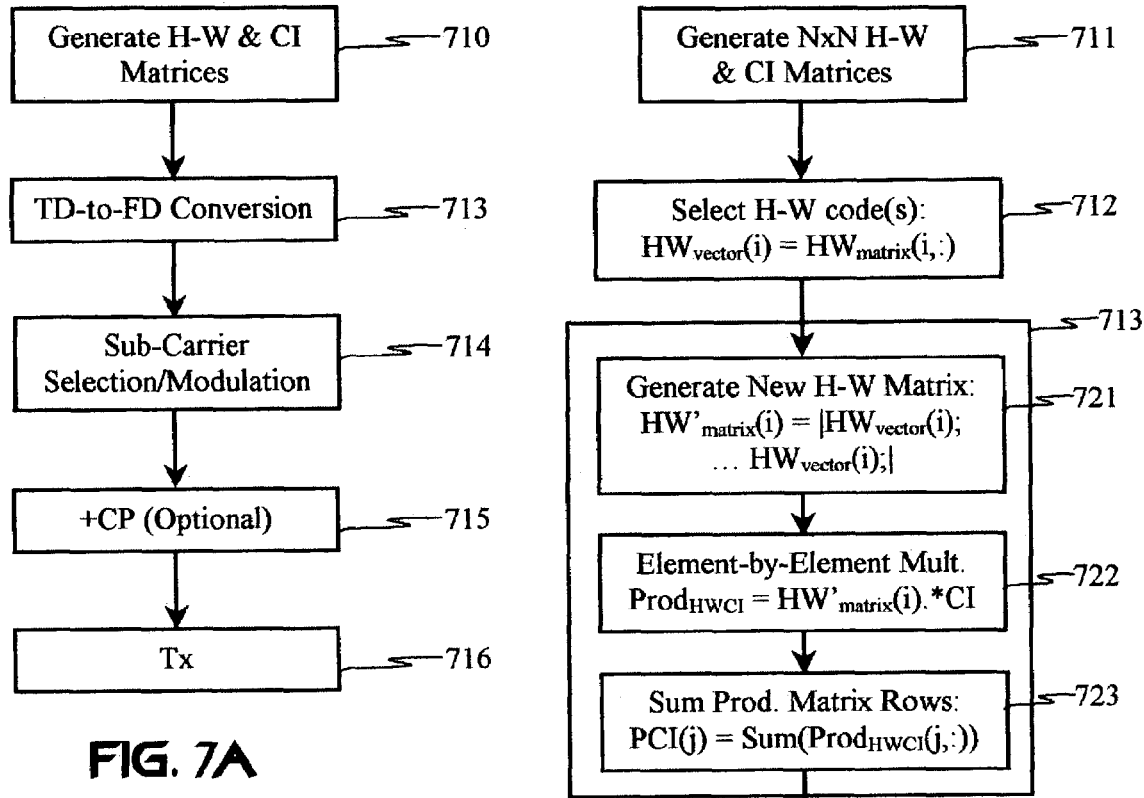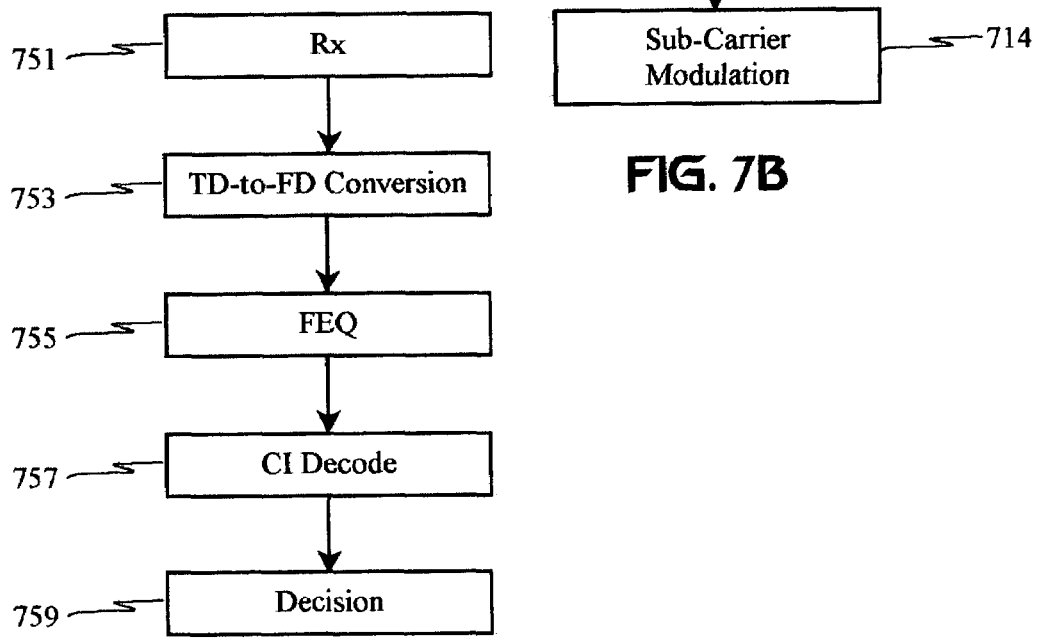
FIG. 7A
FIG. 7B
FIG. 7C

ORTHOGONAL SUPERPOSITION CODING FOR DIRECT-SEQUENCE COMMUNICATIONS

This patent application claims priority to patent application Ser. No. 60/422,670, filed on Oct. 31, 2002.

FIELD OF THE INVENTION

The present invention relates to a novel multicarrier spread-spectrum protocol for wireless and waveguide communications.

BACKGROUND OF THE INVENTION

Direct sequence CDMA (DS-CDMA) is particularly useful in multiple-access communications because it allows efficient use of the frequency spectrum and provides for improved frequency reuse. However, DS-CDMA systems can suffer from interference and distortion that reduce their ability to support data communications.

OFDM has a high spectral efficiency (the spectrum of the subcarriers overlap) and combats frequency-selective fading. However, the amplitude of each carrier is affected by the Rayleigh law, hence flat fading occurs. Even with good channel estimation and channel coding, fading and interference can easily compromise the performance of OFDM.

Multi-carrier CDMA (MC-CDMA) applies CDMA spreading codes to orthogonal subcarriers to enhance frequency-diversity benefits. However, MC-CDMA, like OFDM, suffers from a high peak-to-average-power ratio (PAPR). The high PAPR of conventional multi-carrier signals imposes significant constraints on the transmission circuitry and significantly increases power consumption.

Carrier Interferometry (CI) is a multi-carrier technology invented by Applicant and described in over 70 technical journals and conference proceedings, as well as in two textbooks. As a multicarrier transmission protocol, CI provides unsurpassed performance and versatility compared to all other technologies.

The description of the preferred embodiments assumes that the reader has a familiarity with CI, such as described in the following publications, which are incorporated by reference:

1. B. Natarajan, C. R. Nassar, S. Shattil, M. Michelini, "Application of interferometry to MC-CDMA", accepted for publication in IEEE Transactions on Vehicular Technology.
2. C. R Nassar, B. Natarajan, and S. Shattil, "Introduction of carrier interference to spread spectrum multiple access," IEEE Emerging Technologies Symposium, Dallas, Texas, 12-13 April 1999.
3. B. Natarajan and C. R. Nassar, "Introducing novel FDD and FDM in MC-CDMA to enhance performance," IEEE Radio and Wireless Conference, Denver, Colo., Sep. 10-13, 2000, pp. 29-32.
4. Z. Wu, C. R. Nassar, A. Alagar, and S. Shattil, "Wireless communication system architecture and physical layer design for airport surface management," 2000 IEEE Vehicular Technology Conference, Boston, Mass., Sep. 24-28, 2000, pp. 1950-1955.
5. S. Shattil, A. Alagar, Z. Wu and C. R. Nassar, "Wireless communication system design for airport surface management—Part I: Airport ramp measurements at 5.8 GHz," 2000 IEEE International Conference on Communications, Jun. 18-22, 2000, New Orleans, pp. 1552-1556.
6. B. Natarajan, C. R. Nassar, and S. Shattil, "Carrier Interferometry TDMA for future generation wireless—Part I: Performance," accepted for publication in IEEE Communications Letters.
7. Z. Wu, C. R. Nassar, and S. Shattil, "Capacity enhanced DS-CDMA via carrier interferometry chip shaping," IEEE 3G Wireless.Symposium, May 30-Jun. 2, 2001, San Francisco, Calif.
8. Z. Wu, C. R. Nassar, and S. Shattil, "Frequency diversity performance enhancement in DS-CDMA via carrier interference pulse shaping," The 13$^{th}$ Annual International Conference on Wireless Communications, Calgary, Alberta, Canada, Jul. 7-10, 2001.
9. C. R. Nassar and Z. Wu, "High performance broadband DS-CDMA via carrier interferometry chip shaping," 2000 International Symposium on Advanced Radio Technologies, Boulder, Colo., Sep. 6-8, 2000.
10. Z. Wu and C. R. Nassar, "MMSE frequency combining for CI/DS-CDMA," IEEE Radio and Wireless Conference, Denver, Colo., Sep. 10-13, 2000, pp. 103-106.
11. D. Wiegandt, C. R. Nassar, and S. Shattil, "High Performance OFDM for next generation wireless via the application of carrier interferometry," IEEE 3G Wireless Symposium, May 30-Jun. 2, 2001, San Francisco, Calif.
12. B. Natarajan, C. R. Nassar, and S. Shattil, "Exploiting frequency diversity in TDMA through carrier interferometry," Wireless 2000: The 12$^{th}$ Annual International Conference on Wireless Communications, Calgary, Alberta, Canada, Jul. 10-12, 2000, pp. 469-476.
13. S. A. Zekevat, C. R. Nassar, and S. Shattil, "Smart antenna spatial sweeping for combined directionality and transmit diversity," accepted for publication in Journal of Communication Networks: Special Issue on Adaptive Antennas for Wireless Communications.
14. S. A. Zekevat, C. R. Nassar, and S. Shattil, "Combined directionality and transmit diversity via smart antenna spatial sweeping," 38$^{th}$ Annual Allerton Conference on Communications, Control, and Computing, Champaign-Urbana, Ill., Oct. 4-6, 2000.
15. S. Shattil and C. R. Nassar, "Array Control Systems For Multicarrier Protocols Using a Frequency-Shifted Feedback Cavity" IEEE Radio and Wireless Conference, Denver, Colo., Aug. 1-4, 1999.
16. C. R. Nassar, et. al., *MultiCarrier Technologies for Next Generation Multiple Access*, Kluwer Academic Publishers: 2001.
17. U.S. patent application entitled "Carrier Interferometry Networks," filed May 14, 2002.
18. U.S. patent application entitled "Multicarrier Sub-Layer for Direct-Sequence Channel and Multiple-Access Coding," filed Apr. 24, 2002.
19. PCT Appl. PCT/US01/50856 entitled "Carrier Interferometry Coding and Multicarrier Processing," filed Dec. 26, 2001.
20. U.S. Pat. application entitled "Multiple Input, Multiple Output Carrier Interferometry Architecture," filed Nov. 22, 2000.
21. U.S. patent application entitled "Method and Apparatus for Transmitting and Receiving Signals having a Carrier Interferometry Architecture," filed Jul. 19, 2000.
22. U.S. patent application entitled "Method and Apparatus for using Multicarrier Interferometry to Enhance Optical Fiber Communications," filed Nov. 2, 1999.
23. PCT Appl. PCT/US99/02838 entitled "Multiple Access System and Method," filed Feb. 10, 1999.

Many implementations of CI codes are characterized by block coding. In single-carrier modulation, pulse shaping provides sequential overlapping pulse waveforms. Even block transmissions, such as direct-sequence codes and other time-domain sequences (e.g., packets, frames, etc.) are more accurately characterized by sequential pulse waveforms than by block-coded CI pulse waveforms. Time-domain equalization, Rake reception, and other time-domain receiver processes can sometimes provide poorer performance results when block-coded CI waveforms are used rather than sequential waveforms. Similarly, block frequency-domain processing of sequential waveforms can provide poorer performance than processing block waveforms.

Thus, there is a need in the art to provide CI transceivers with the capability of efficiently processing both block and sequential types of signal waveforms. There is also a need in the art to efficiently process single-carrier signals via multi-carrier techniques. This need is naturally extended to multi-antenna processing wherein greater bandwidth efficiencies are achieved by employing frequency-domain or time-domain processing together with spatial processing.

SUMMARY OF THE INVENTION

The needs in the art are addressed by the apparatus and methods of the present invention. The principle object of the invention is to provide a multi-carrier protocol that can be adapted to a wide range of conventional multi-carrier and single-carrier protocols. Another object is to present a spread-spectrum protocol that is specifically designed for mobile communications. These objects are accomplished by providing a multi-carrier protocol that controls and shapes interference relationships between the carriers. This control enables time domain signal shaping, which provides for low PAPR and adaptability to single-carrier waveforms. The protocol enabled by the present invention is a new variation of CI.

One set of embodiments of the present invention is drawn to signal waveforms as items of manufacture. The invention includes a sequence of overlapping pulse waveforms, each modulated with at least one data symbol, each pulse waveform being characterized by a plurality of orthogonal sub-carriers. The pulses are typically uniformly and orthogonally (or pseudo-orthogonally) positioned in time.

Another embodiment of the invention includes a block of orthogonal pulse waveforms generated from a plurality of polyphase, poly-amplitude (i.e., complex) sub-carrier weights applied to a predetermined set of subcarriers. In particular, a block of coded pulses corresponding to a direct-sequence code is generated from a set of sub-carrier weights corresponding to at least one family of orthogonal (or pseudo-orthogonal) polyphase and/or poly-amplitude codes. In either type of waveform, data may be modulated directly onto the subcarriers or the pulses. Either type of waveform may be configured for single-channel or multiple-access communications. Waveforms of the invention may be adapted for transmission across one or more subspaces.

In a particular aspect of the invention, each pulse waveform is generated from a superposition of a predetermined set of orthogonal subcarriers. In another aspect of the invention, subcarriers are selected relative to one or more conditions, including availability of spectrum, multipath fading, and interference. The pulses may be shaped in the time domain and/or the frequency domain. Time-domain shaping may take the form of applying a direct-sequence code or sequence of weights to the pulses in order to shape and/or select a subset of the subcarriers. The set of subcarriers may include contiguous frequencies, non-contiguous equally spaced frequencies, or unequally spaced frequencies. The set of subcarriers may be hopped at predetermined time intervals, such as at intervals equal to a data symbol interval $T_s$, or some integer multiple thereof. Hopping times and/or patterns may be controlled via coding, such as random or pseudo-random coding. In another aspect of the invention, the subcarriers may be chirped waveforms.

The subcarriers may be selected for a particular user, such as in an orthogonal frequency division multiple access system. Subcarriers allocated to a particular user may be interleaved in frequency with subcarriers allocated to one or more other users. In another aspect of the invention, a different set of subcarriers is selected for each of a plurality of data symbols or data symbol groups transmitted by and/or to a particular user. A plurality of users may share a common set of subcarriers, yet share the channel via time division multiple access (TDMA), code division multiple access (CDMA), and/or space division multiple access (SDMA). Other multiple-access schemes may be employed. Similarly, different data symbols corresponding to a particular user may share the channel relative to the previously mentioned multiple-access schemes.

Also included are signal generator and transmitter embodiments for generating signals of the invention. One embodiment of the invention includes a sub-carrier allocator, a pulse generator, a modulator, and a sequential pulse positioner. The sub-carrier allocator assigns a predetermined set of subcarriers to a particular data symbol, user, or group of users. The pulse generator produces a plurality of pulses wherein the spectrum of each pulse or group of pulses is characterized by the set of subcarriers. The modulator modulates the pulses or subcarriers with at least one data symbol. The pulse positioner sequentially positions the modulated pulses.

Another transmitter embodiment of the invention includes a polyphase, poly-amplitude code generator, a sub-carrier allocator, a subcarrier weighting module, and a sub-carrier combiner. The code generator produces at least one of a set of polyphase, poly-amplitude codes configured to produce a predetermined time-domain signal, such as a direct sequence coded signal. The transmitter may include a modulator adapted to modulate data onto the codes, the subcarriers, or the time-domain signal. The subcarrier weighting module impresses the polyphase, poly-amplitude codes onto a predetermined set of orthogonal subcarriers selected by the sub-carrier allocator. The combiner combines the subcarriers to produce the time-domain signal.

In one aspect of the invention, a transmitter is adapted to provide both sequential and block pulse generation. A receiver is similarly adapted to process both sequential and block signals.

A receiver embodiment of the invention includes a sliding-window transform and a CI decoder. The sliding-window transform is configured to produce multiple sets of selected orthogonal sub-carrier values from a received signal. Each set corresponds to a window having a different time offset relative to the received signal. Each window overlaps at least its adjacent window(s). The CI decoder is adapted to provide complex decoding weights to the sub-carrier values, optionally provide for channel equalization, and combine the weighted sub-carrier values to generate a sequence of estimated data symbols. The sliding-window transform may be described as a sliding time-domain to frequency-domain converter, and the CI decoder may be described as a frequency-domain to time-domain converter and/or a combiner.

A CI decoder may optionally include receiver components illustrated in the figures and described throughout the specification and incorporated references. For example, a CI decoder may include an equalizer (such as a time-domain equalizer and/or a frequency-domain equalizer), a de-mapper, a de-interleaver, a decoder, a de-scrambler, a filter (such as a matched filter), an integrator, and/or a decision module.

CI receivers may be adapted to process either or both single-carrier and multi-carrier signals. Frequency-domain analysis and processing of single-carrier signals may be performed relative to pulse characteristics. For example, number of subcarriers, sub-carrier spacing, and window durations in receiver processing may be selected relative to physical signal parameters, such as pulse width, pulse shape, and pulse spacing.

In another receiver embodiment of the invention, a received signal is separated into a plurality of orthogonal sub-carrier components by a time-domain to frequency-domain converter. The output of the converter is characterized by orthogonal poly-amplitude (and polyphase) coded data. The converter may be adapted to perform a Fourier transform, such as an FFT or a DFT. A combiner performs frequency-domain equalization and provides CI decoding of the coded data.

Transmitter and receiver embodiments of the invention may be adapted to arrayprocessing and subspace coding applications, including multiple input/multiple output (MIMO), multiple input/single output (MISO), and single input/multiple output (SIMO) processing. One aspect of the invention is a method of communicating signals from at least two spatially separated remote transmitters to a receiving base station having a multi-element antenna array. Each of the transmitters transmits signals representative of different information. In accordance with this aspect of the invention, the mathematical representation of the spectral characteristics of the signals is capable of being put in a mathematical form that is substantially the same as the mathematical representation of the spatial characteristics of signals received by a multi-element antenna array. This enables the receiver to efficiently process the received signals to simultaneously obtain adaptive spectral and spatial despreading and spreading weights that enhance the signal to noise plus ratio of the signals. The receiver can then identify the data associated with each of the signals transmitted by the transmitters. The analogy between CI decoding and adaptive antenna array processing also enables combining both spatial and spectral expressions in one mathematical expression that can be solved in one unified spectral/spatial calculation. This expression may provide for optimal combining, interference cancellation, and/or multi-user detection.

Another objective is to provide a universal communication protocol that provides frequency-diversity benefits of multi-carrier modulation to single-carrier systems, enables the low-PAPR benefits of single-carrier modulation to multicarrier communication systems, and offers the benefits of both systems simultaneously. Further objectives and benefits of the invention will become apparent in the-Description of the Preferred Embodiments.

BRIEF DESCRIPTION OF THE DRAWINGS

FIG. 7A shows a block diagram illustrating a transmission method of the invention.

FIG. 7B is a detailed illustration of a CI-based transmitter and transmission method.

FIG. 7C shows CI processing of received single-carrier and/or multi-carrier signals.

DESCRIPTION OF THE PREFERRED EMBODIMENTS

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
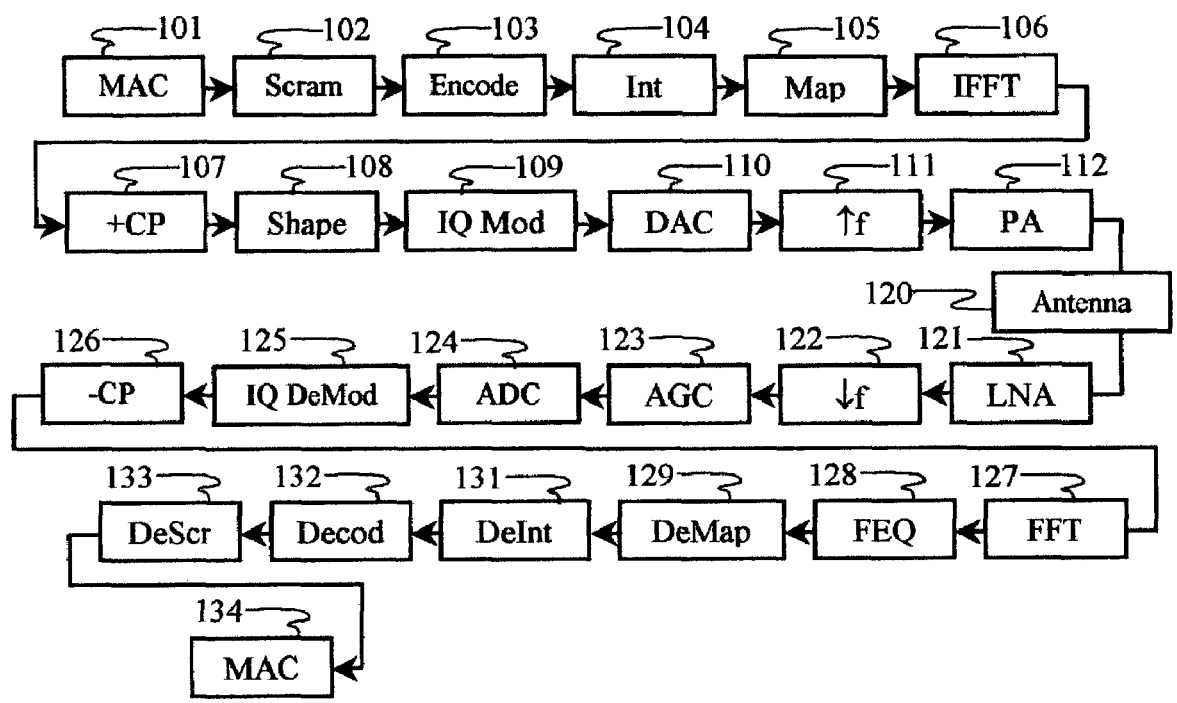
FIG. 1 is a functional block diagram of a wireless communication transceiver according to an illustrative embodiment of the present invention.

A transceiver apparatus illustrated in FIG. 1 is adapted to function in accordance with the present invention. The transceiver includes a MAC processing block 101 adapted to pass data to a scrambler 102. Scrambled data bits are provided with channel coding in a coding block 103. Coded data is interleaved by an interleaver 104 prior to being mapped into data symbols in a mapping block 105. The symbols are provided to input bins of an inverse discreet Fourier transform (IDFT), such as an inverse fast Fourier transform (EFFT) 106. A cyclic prefix prepender block 107 optionally prepends and/or appends a guard interval, such as a cyclic prefix, to the time-domain signal output from the transform 106. A signal-shaping block 108 may provide time domain and/or frequency-domain shaping to the transform 106 output. An in phase/quadrature phase (I/Q) modulator 109 is coupled to a digital-to-analog converter (DAC) 110. Analog signals are up converted to a transmission frequency in a frequency up-converter 111. The resulting transmission signal is amplified by a power amplifier 112 prior to being coupled into a communication channel by at least one antenna 120.

Signals received from the at least one antenna 120 are amplified by a low-noise amplifier (LNA) 121 prior to down conversion by a frequency down-converter 122. The down-converted signals are baseband or intermediate-frequency (IF) signals. An automatic gain controller (AGC) 123 processes the down converted analog signals prior to being digitized in an analog-to-digital converter (ADC) 124. The digitized signals are processed in an I/Q demodulator 125 prior to cyclic-prefix removal 126. The digital signal is processed with a DFT algorithm, such as a fast transform performed by an FFT 127. A frequency-domain equalizer (FEQ) 128 performs frequency-domain equalization of the output FFT 127 bins prior to symbol de-mapping by a de-mapper block 129. The recovered data bits are de-interleaved by a de-interleaver 131 prior to processing in a channel decoder 132 and a de-scrambler 133. The descrambler output may optionally be processed in a MAC block 134 prior to data output.

Specific elements of the transceiver that may be adapted to the present invention include the mapping block 105 (which is adapted to provide CI coding to data bits or data symbols), the IFFT 106 (which is adapted to provide a sliding window signal output or transform), the FFT 127 (which is adapted to provide a sliding window transform to received data), and the de-mapping block 129 (which is adapted to perform CI decoding). The de-mapping block 129 may perform optimal combining, successive interference cancellation (SIC), multi-user detection, or some other appropriate algorithm for enhancing desired signals and/or removing interference. Accordingly, the FEQ 128 may be integrated into the de-mapping block 129. Furthermore, the FEQ 128 (or the de-mapping block 129) may be adapted to perform any combination of time-domain equalization and frequency-domain equalization. Other functional blocks illustrated in FIG. 1 may also be combined.

It is well known in the art that various components illustrated in FIG. 1 are optional. Optional components may include the MAC 101, the scrambler 102, the encoder 103, the interleaver 104, the cyclic-prefix prepender 107, the pulse shaper 108, the I/Q modulator 109, the DAC 110, the up converter 111, and/or the power amplifier 112. Optional components may also include the LNA 121, the down converter 122, the AGC 123, the cyclic-prefix remover 126, the FEQ 128, the de-interleaver 131, the decoder 132, the descrambler 133, and/or the MAC 134.

Figure 2A:
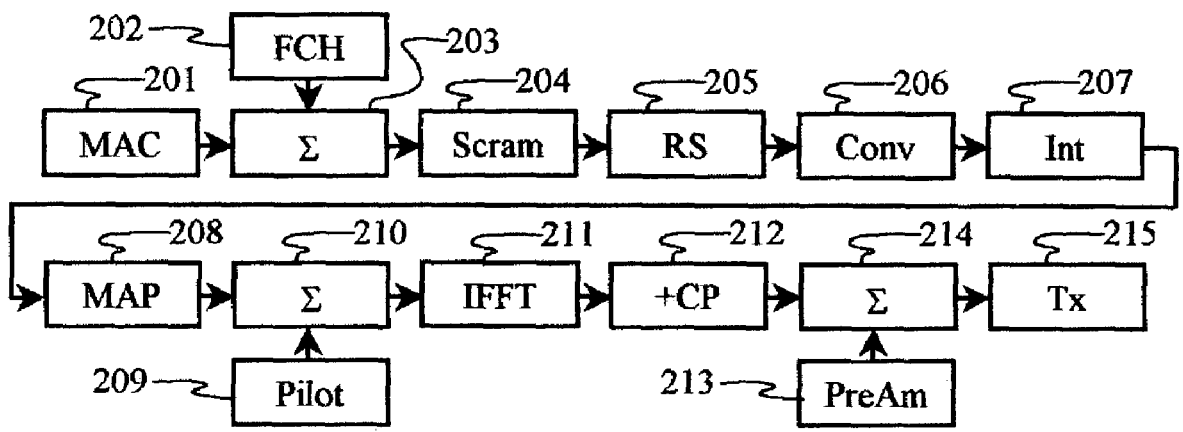
FIG. 2A illustrates an exemplary transmission system and method of the invention.

The present invention also teaches a method and apparatus for generating sequential (i.e., sliding) time-domain waveforms from.:a selected plurality of discreet frequency components. This method and apparatus, which are illustrated functionally in FIG. 2A, includes an inventive CI-mapping block 208 configured to provide for mapping data bits or symbols to sliding-CI symbols. Vectors of sliding-CI symbols are used to produce sequential, or sliding, time-domain symbol outputs from an IFFT 211 or some other invertible transform (not shown). Sliding time-domain symbols may be characterized by overlapping sequential (non-block) waveforms. The function of the mapping block 208, when coupled to the IFFT 211, provides for frequency allocation. The output of the IFFT 211 is typically characterized by a set of orthogonal subcarriers. Also, the mapping block 208 may provide for spectral shaping of the time-domain sequence output by the IFFT 211. Spectrum shaping is typically employed for predistortion or improved channelization. Spectral shaping may be employed to provide predetermined pulse shapes (such as raised cosine, Bessel, or other well-known pulse shapes) to the IFFT 211 output signals.

User data from a MAC 201 is optionally combined 203 with control data from a frame control header 202. The data may be scrambled 204 with respect to a predetermined initialization, which typically depends on uplink or downlink. Reed-Solomon coder 205 generates small code blocks based on a larger RS code by puncturing the large code blocks down to the required size. The data is prepended with zeros and unwanted parity bytes and output zeros are truncated. In this particular embodiment of the invention, a constraint-length 7 convolutional coder 206 is provided and followed by a two-stage interleaver 207. Mapped data bits are optionally combined 210 with pilot symbols from a pilot generator 209 and assigned to subcarriers. The mapping block 208 may optionally perform input expansion in which an appropriate number of null symbols are added to expand the input data to a predetermined number of input bins. Guard intervals, or cyclic prefixes, are provided by a CP block 212. Cyclic prefix lengths are typically at least one of a set of predetermined fractions of a symbol duration. A preamble from a preamble generator 213 is typically added 214 to each data frame or block prior to being coupled into a transmission system 215.

Figure 2B:
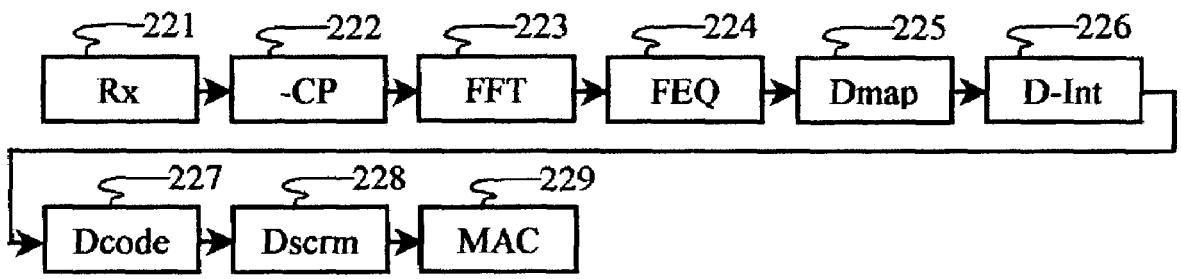
FIG. 2B illustrates functional components of a receiver of the invention.

The present invention also teaches a method and apparatus for receiving and efficiently processing sequential (i.e., sliding) time-domain waveforms. FIG. 2B illustrates a receiver method and apparatus of the invention adapted to process received sliding signals. A sliding-window FFT 223 (or some other sliding invertible transform) separates at least one received signal into a plurality of orthogonal basis values (e.g., values corresponding to a predetermined set of orthogonal sub-carrier frequencies). An optional FEQ 224, which can be integrated into a CI de-mapper 225, provides for frequency-domain equalization. Alternatively, various combinations and types of time-domain equalization may be employed.

The sliding-window FFT 223 calculates frequency coefficients for each transformation window. An initial batch of N samples can be transformed by a DFT or FFT process. After an initialization of N samples, the DFT of a sequence (e.g., an infinite sequence) of samples can be updated in an incremental, or sliding sample, basis without having to recalculate an FFT at each sample time. It is well known that the function of a sliding DFT can be expressed by the following relationship:

$$X_{k+1}(f_m) = e^{j2\pi f_m/N}(X_k(f_m) + x_{k+N} - x_k)$$

The term $X_k(f_m)$ is a sub-carrier coefficient for a frequency $f_m$, the subscript k associated with $X_k(f_m)$ indexes a particular sliding window, and $x_k$ denotes a discrete time sample. The time samples are indexed by coefficients k or k+N.

Since each sub-carrier coefficient $X_k(f_m)$ is computed independently of the other sub-carrier coefficients, computations involving unused subcarriers can be avoided. This aspect of the invention reduces the transceiver complexity in cases where different user sub-carriers are interleaved in the frequency domain and/or when certain subcarriers are ignored due to interference or deep fades.

Various components shown in FIG. 2B are commonly used in receivers. A receiver system 221 is configured to couple transmissions from a communication channel, perform any necessary RF-signal processing (such as filtering and linear amplification) and down convert the received signals to baseband or IF signals. The receiver also includes a cyclic-prefix remover 222. Data processing at the receiver may be performed by a de-interleaver 226, a channel decoder 227, and a descrambler 228. MAC-layer processing is performed in an optional MAC block 229. Additional components, such as demultiplexers and spread-spectrum decoders, although not shown, may be employed.

A simple case of the present invention provides for sliding transform windows and sliding waveforms of equal temporal width. The invention also provides for transform widths greater than or less than the waveform widths. In a sliding-window transform of a plurality of sliding (i.e., temporally displaced) waveforms, a particular transform window is typically centered on one of the sliding waveforms. The other waveforms are either partially or completely outside the window. Each non-centered waveform in a particular FFT window contributes some degree of interference to the FFT bin values obtained for a waveform centered in the window. The ratios of interference are mathematically related to CI symbol values. Thus appropriate CI processing may be provided, as is well known in the art, to separate or remove interfering signals. When the values are summed over all of the bins, the interference substantially cancels. The resulting sum can be recognized intuitively as the cross correlation between two or more time-offset waveforms. If the waveform positions are substantially orthogonal to each other, the cross correlation (i.e., interference) to autocorrelation ratio is desirably small.

Preferred embodiments of the invention minimize the cross correlation between the time-offset waveforms by various processing methods. These methods include any combination of pulse shaping, adaptive and/or optimal positioning of the pulse waveforms in time, shaping the sliding windows, providing for interference cancellation at the receiver, and/or providing for transmit-side coding to compensate for temporal-overlap interference at the receiver. Thus, the demapper 225 not only provides sub-carrier combining to reconstruct a desired data symbols, it may also perform combining to separate or remove interference symbols.

Figure 3A:
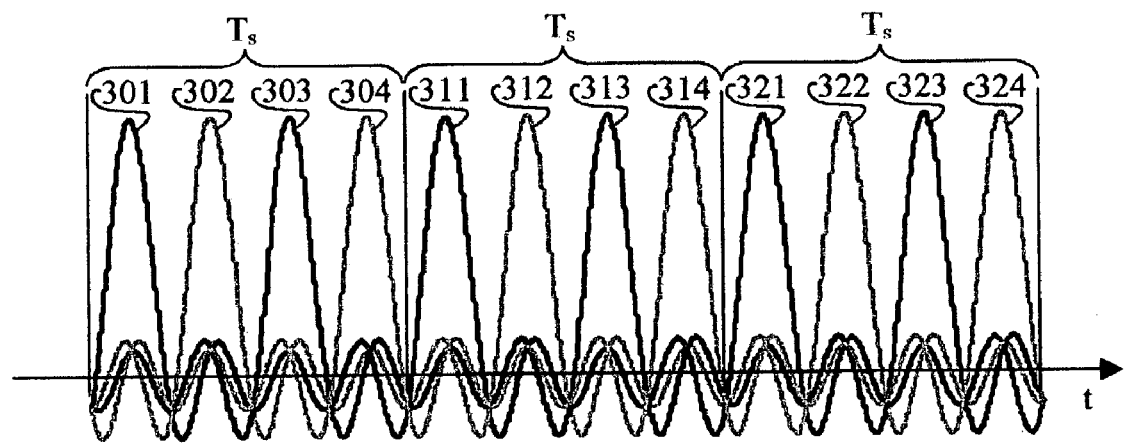
FIG. 3A illustrates three pulse-waveform blocks wherein each block includes four pulse waveforms of duration $T_s$.

Functional aspects of the present invention are described with respect to signal-waveform illustrations and corresponding descriptions. For example, FIG. 3A illustrates a typical CI block mode of operation that may be employed by the invention. A particular block transmission characterized by symbol duration T, includes four orthogonal sinc-like pulse waveforms 311, 312, 313, and 314. Each pulse waveform (such as pulses 311, 312, 313, and 314) may be impressed with a unique data symbol. Implementations of CI pulse waveforms for TDMA and direct-sequence CDMA are described in WIPO Pub. App. No. WO 99/41871, B. Natarajan, C. R. Nassar, and S. Shattil, "Exploiting frequency diversity in TDMA through carrier interferometry," The 12th Annual International Conference on Wireless Communications WIRELESS2000, Calgary, Alberta, Canada, Jul. 10-12, 2000, pp. 469-476, and Z. Wu and C. R. Nassar, "MMSE frequency combining for CI/DS-CDMA," IEEE Radio and Wireless Conference, Denver, Colo., Sep. 10-13, 2000, pp. 103-106, each of which is hereby incorporated by reference in its entirety.

A preceding block transmission includes orthogonal pulse waveforms 301, 302, 303, and 304 and a following block transmission includes orthogonal pulse waveforms 321, 322, 323, and 324. Block transmissions are characteristic of multi-carrier operation. For example, OFDM employs sub-carrier blocks defined by uniform start and end times for each subcarrier, the difference in times typically being equal to the symbol duration $T_s$ or the symbol duration $T_s$ plus a cyclic prefix. Cyclic prefixes, cyclic "post-fixes", or some other guard interval may be included in the signal plots, such as between the blocks shown in FIG. 3A and/or between waveforms or waveform groups shown in FIG. 3B.

Since the pulse waveforms 311, 312, 313, and 314 have the same starting and ending times, the waveform shapes 311, 312, 313, and 314 are different from each other. For example, waveform 311 has all of its sidelobes to the right of its main lobe, whereas all of the sidelobes of waveform 314 occur to the left of the main lobe. This tends to increase the interference in systems that perform time-domain equalization and Rake reception. In particular, inter-pulse interference is not limited to nearby pulses because the side-lobe structure is periodic, or cyclic, over the symbol duration $T_s$. For example, the side-lobe amplitude (and thus, interference) of waveform 311 diminishes across pulse 312 and increases across pulse 314.

In this particular example, the pulse waveforms may be generated from four orthogonal sub-carrier frequencies, which are not shown. An equivalent (but not practical) method of generating the pulse waveforms 311, 312, 313, and 314 includes providing each periodic pulse waveform, such as pulses 301, 311, and 321, modulated with a corresponding data symbol. Mathematically, the periodic pulses extend from $-\infty$ to $+\infty$. This is done merely to provide narrowband sub-carrier components. Then an interval of symbol duration $T_s$ of the pulses is selected.

Harmonic subcarriers may be produced via periodic pulse generation, such as described in U.S. Pat. No. 5,955,992, and U.S. Pub. App. No. 20020034191, which are incorporated by reference in their entireties. Similarly, a second group of pulses, such as represented by pulses 302, 312, and 322, are modulated with a second information signal. Pulse group 303, 313, and 323, and pulse group 304, 314, and 324 are processed in a similar way.

Figure 3B:
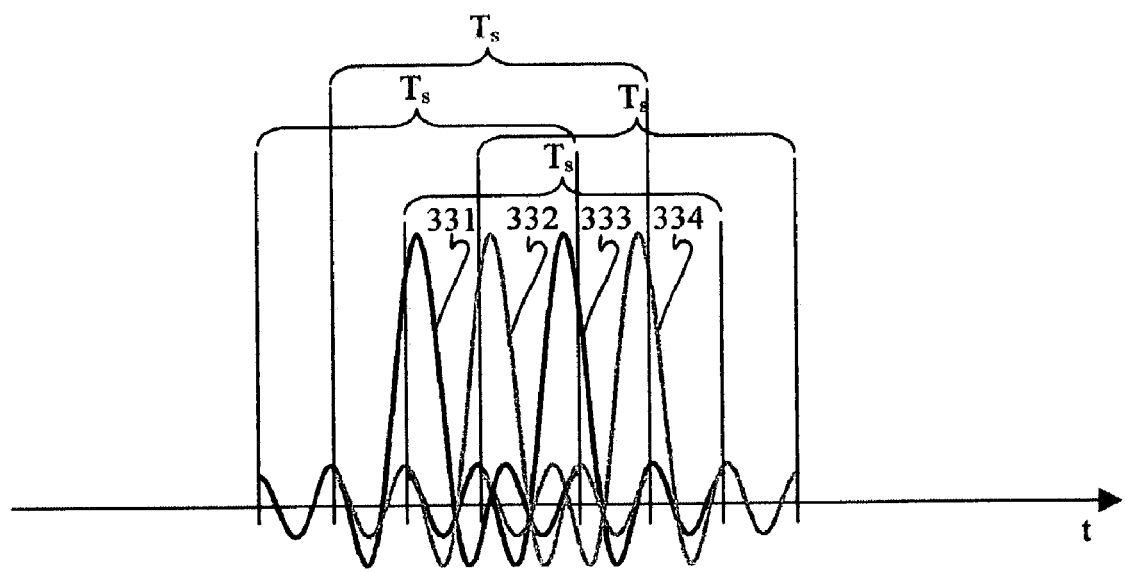
FIG. 3B illustrates four sequentially positioned pulse waveforms that are substantially orthogonal to each other.

FIG. 3B illustrates a set of waveforms 331, 332, 333, and 334 indicative of a sequential, or sliding, operating mode of the invention. The pulse waveforms 331, 332, 333, and 334 are typically modulated with different data symbols. The pulse waveforms 331, 332, 333, and 334 are identical to each other in shape prior to modulation. In this particular case, waveforms 331, 332, 333, and 334 generated by the invention provide high-performance backwards compatibility with conventional single-carrier systems. Each of the pulse-waveform frames 331, 332, 333, and 334 having duration $T_s$ is offset in time to provide a substantial degree of orthogonality. In this particular case, the offset equals the pulse width: $T_{offset}=T_{pw}=1/Mf_s$, where M is the number of subcarriers and $f_s$ is the subcarrier frequency spacing. Other implementations of the invention provide for processing cyclic prefixes appended to the waveforms 331, 332, 333, and 334 or sub-carrier components.

In one aspect of the invention, each sequential pulse waveform 331, 332, 333, and 334 may be generated from a periodic sequence of pulse waveforms (such as may be generated via harmonic superposition or periodic time-domain processes) and then provided with sequential, overlapping modulation (or modulated with sequential, overlapping data symbols). A block transmission, such as illustrated in FIG. 3A, may be used to generate unmodulated versions of the pulse waveforms 331, 332, 333, and 334. Accordingly, the unmodulated pulse waveforms 331, 332, 333, and 334 may be illustrated by part of the block transmission illustrated in FIG. 3A.

A substantial difference between pulse waveforms 331, 332, 333, and 334 shown in FIG. 3B and pulse waveforms 311, 312, 313, and 314 shown in FIG. 3A is that the sequential modulation shown in FIG. 3B is centered at the peak of each pulse waveform 331, 332, 333, and 334 and the block modulation shown in FIG. 3A is centered with respect to each block transmission and irrespective of the pulse positions within each block. Accordingly, pulse generation may employ an IFFT to generate periodic pulses with period $T_s$ wherein the IFFT and an associated CI coder are adapted to provide sequential overlapping modulation at modulation intervals equal to the pulse width $T_{PW}$ (or pulse width $T_{PW}$ plus a cyclic-prefix interval $T_{CP}$).

It is anticipated that the invention may be provided with the capability to select either block-mode or sliding-mode operation. One method of providing block-mode operation involves selecting the time interval between windows to be equal to, or greater than, the window duration. Similarly, the window duration may be selected to be equal to, or smaller than, the time interval between windows. Accordingly, block transmission provides for generating non-overlapping block waveforms and windows, whereas sliding transmission provides for generating sequential overlapping waveforms and windows. It should be noted that a block waveform may include overlapping pulse waveforms (such as shown in FIG. 3A) that are each constrained to a given block duration (e.g., $T_s$).

Figure 3C:
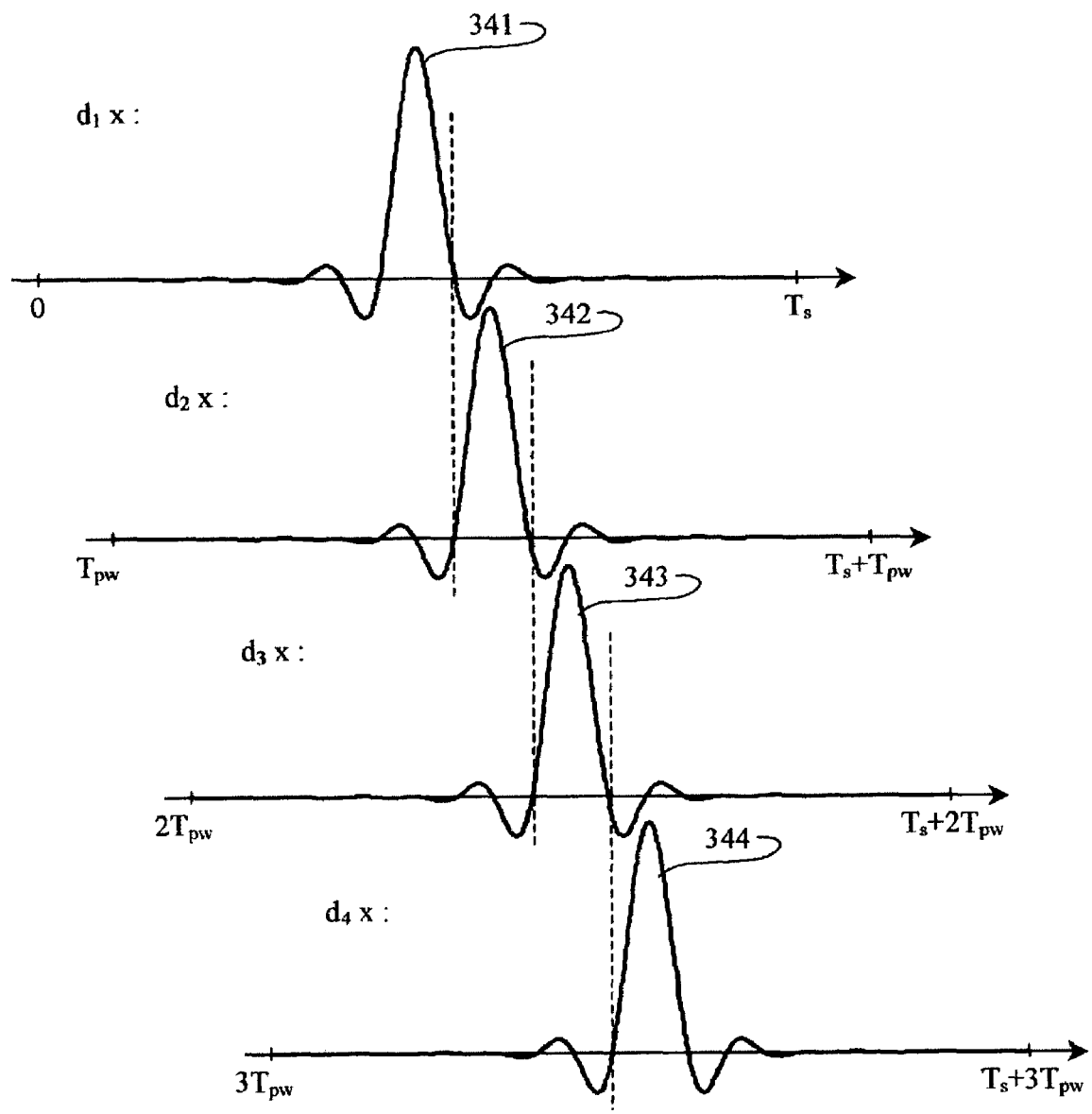
FIG. 3C illustrates a set of sequentially positioned CI pulse waveforms with raised-cosine shaping.
Figure 3D:
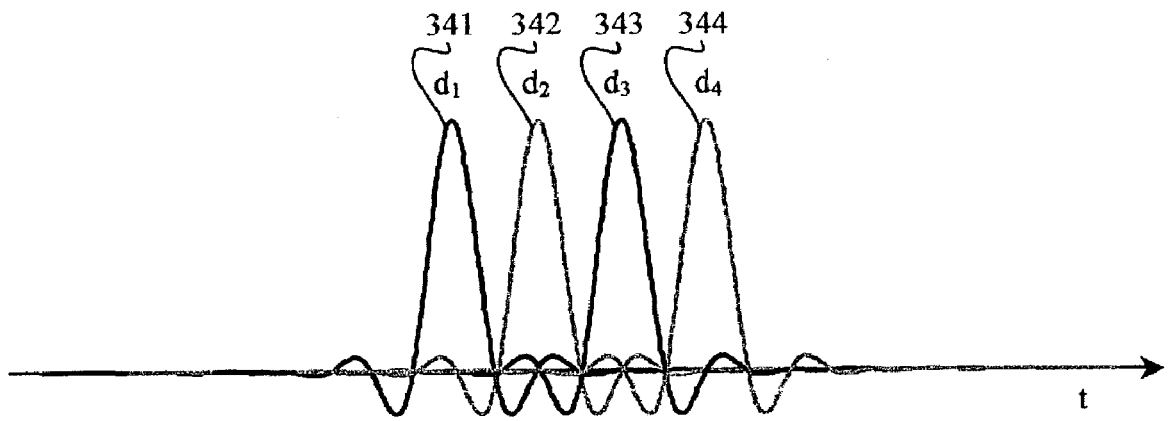
FIG. 3D illustrates the pulse waveforms shown in FIG. 3C arranged on a single time axis.
Figure 3E:
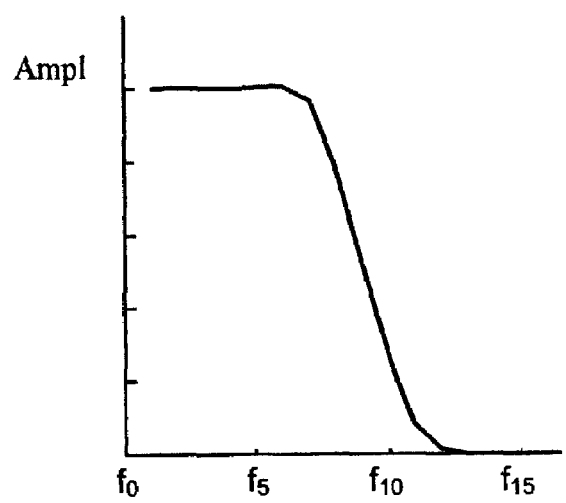
FIG. 3E shows the spectrum of a CI pulse with a raised-cosine shape.

FIG. 3C illustrates a plurality of sequential raised-cosine pulses 341, 342, 343, and 344. Each of the pulse waveforms 341, 342, 343, and 344 has a waveform duration equal to a data symbol period $T_s$. The pulses 341, 342, 343, and 344 are time offset relative to each other by a pulse width (i.e., pulse duration) $T_{pw}$. A sequence of data symbols $d_1$, $d_2$, $d_3$, and $d_4$ are modulated onto the pulse waveforms 341, 342, 343, and 344, respectively. The resulting modulated overlapping waveforms are combined (e.g., summed), as shown in FIG. 3D. FIG. 3E illustrates the spectrum of one of the raised-cosine pulses 341, 342, 343, and 344 over a symbol period $T_s$. In this case, a steep spectral roll-off is exchanged for lower time-domain sidelobes.

Embodiments of the invention provide for shaping basic (i.e., sinc-shaped) CI pulse waveforms to generate the raised-cosine pulses 341, 342, 343, and 344. Time-domain and/or frequency-domain (i.e., spectral shaping) processing may be employed. Alternatively, the invention may provide for generating periodic pulses wherein spectral characteristics of the pulse waveforms are adapted via controlling pulse-generation parameters or providing spectral filtering. In some aspects of the invention, the pulse waveforms 341, 342, 343, and 344 are extended beyond the symbol duration $T_s$. In some aspects of the invention, the time offset between the pulse waveforms 341, 342, 343, and 344 is greater than the pulse width $T_{pw}$.

Figure 3F:
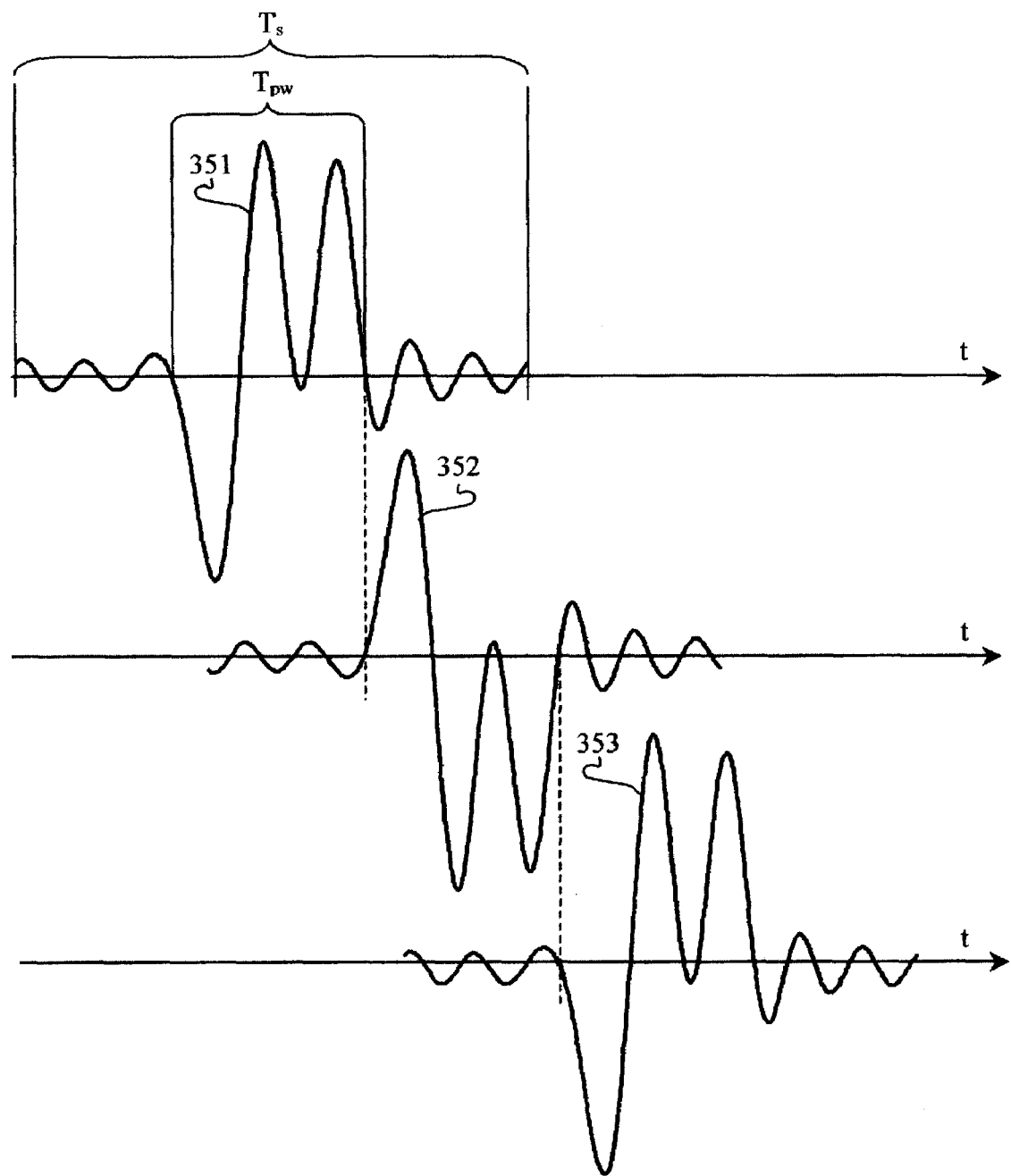
FIG. 3F demonstrates a sequential, or sliding, operating mode of the invention that also employs block pulse waveforms.

In FIG. 3F, a set of waveforms 351, 352, and 353 transmitted by a transmitter of the invention demonstrates a sequential, or sliding, operating mode of the invention. The pulse waveforms 351, 352, and 353 are characterized by a frequency spectrum consisting of a plurality of orthogonal subcarriers. The frequency spacing $f_s$ between the subcarriers provides a symbol duration of $T_s=1/f_s$. Each of the pulse waveforms 351, 352, and 353 is offset in time by a pulse width $T_{pw}$ to provide a substantial degree of orthogonality. After modulation, the pulse waveforms 351, 352, and 353 are combined to provide a sequence of information-modulated pulses. In this example, the pulse waveforms consist of a plurality of (e.g., three) block pulse waveforms. Different data symbols may be impressed onto each block pulse waveform. In other embodiments, the invention may provide transmission and reception of different hybrid sequential/block waveforms.

A variety of sliding-window DFTs are well known in the art. The DFT of a given vector of time-domain samples having length N is expressed as:

$$X(f_m) = \sum_{n=0}^{N-1} x_n e^{-i2\pi n f_m/N}$$

where $X(f_m)$ is the sub-carrier weight corresponding to a particular frequency $f_m$ and n is an index for the time-domain samples $x_n$. An additional time index k corresponding to the DFT windows may be added to the DFT:

$$X_k(f_m) = \sum_{n=0}^{N-1} x_{k+n} e^{-i2\pi n f_m/N}$$

Each of the sliding windows has a length of N samples. The DFT of a neighboring (k+1) window is:

$$X_{k+1}(f_m) = \sum_{n=0}^{N-1} x_{n+k+1} e^{-i2\pi n f_m/N}$$

Substituting p=n+1, where p=1, ..., N, into the previous equation gives:

$$X_{k+1}(f_m) = \sum_{p=1}^{N} x_{p+k} e^{-i2\pi(p-1)f_m/N}$$

A representation of the above equation in which the range of p is changed to p=0, ..., N−1 is expressed as follows:

$$X_{k+1}(f_m) = \sum_{p=0}^{N-1} x_{p+k} e^{-i2\pi(p-1)f_m/N} + x_{k+N} e^{-i2\pi f_m(N-1)/N} - x_k e^{i2\pi f_m/N}$$

The summation term is the representation of $X_k(f_m)$. The exponential $e^{i2\pi f_m/N}$ in the third term can be factored out, resulting in the exponential of the second term being expressed by some integer-multiple of $2\pi$. Thus, the expression for $X_{k+1}(f_m)$ can be expressed by the following recursive relation:

$$X_{k+1}(f_m) = e^{i2\pi f_m/N}(X_k(f_m) + x_{k+N} - x_k)$$

The DFT of window k+1 is computed from the DFT of window k and the difference between the earliest and latest time-domain samples. Each DFT output is multiplied by an exponential term $e^{i2\pi f_m/N}$ that is fixed for each frequency bin $f_m$.

An alternative variation of the sliding transform is derived from the following DFT expression:

$$X_k(f_m) = \sum_{n=k-N+1}^{N-1} x_m e^{-i2\pi n f_m/N}$$

where $X_k(f_m)$ corresponds to the Fourier transform of the previous N samples starting with sample k and evaluated at sub-carrier frequency $f_m$. The resulting recursive relationship is represented by the following equation:

$$X_k(f_m) = X_{k-1}(f_m) + x_k e^{-i2\pi f_m k/N} - x_{k-N} e^{-i2\pi f_m(k-N)/N}$$

The relationship $e^{-i2\pi f_m k/N} = e^{-i2\pi(k-N)/N}$ enables a further simplification to:

$$X_k(f_m) = X_{k-1}(f_m) + (x_k - x_{k-N}) e^{-i2\pi f_m k/N}$$

It will be appreciated that other variations of the sliding Fourier transforms may be employed. Furthermore, sliding variations of other transforms may be employed by the invention. The implementations of sliding DFTs illustrated and described herein are not intended to limit the invention, but are provided for simplicity. Other types of sliding transforms may be employed, including, but not limited to, sliding CI transforms, sliding Hilbert transforms, sliding wavelet transforms, and sliding Walsh transforms. The invention may employ a plurality of waveform and window lengths.

Figure 4A:
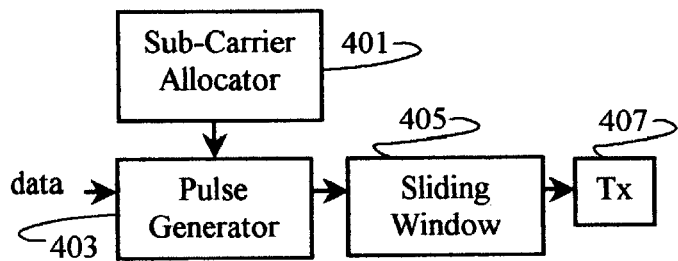
FIG. 4A shows a transmission system adapted to generate sliding pulse waveforms. A modulator (not shown) may be coupled to the input or output of a pulse generator.

FIG. 4A illustrates basic components of a transmission system adapted to generate sliding pulse waveforms, such as shown in FIG. 3B. A pulse generator 403 is configured to generate a plurality of pulse waveforms characterized by a predetermined set of sub-carrier frequencies selected by a subcarrier-allocation circuit 401. The pulse waveforms are positioned sequentially in time by a sliding window transform 405 prior to being processed and coupled into a communication channel by a transmitter 407. The function of the sliding window transform 405 coupled with a modulator (not shown maps data symbols to predetermined instants in time.

In one aspect of the invention, the subcarrier-allocation circuit 401 controls one or more periodic pulse-generation parameters in the pulse generator 403, including pulse-repetition rate, pulse width, and pulse shape. Thus, time-domain properties of the pulses are controlled to provide predetermined spectral characteristics. In another aspect of the invention, the subcarrier-allocation circuit 401 provides a set of subcarriers to the pulse generator 403. The pulse generator 403 combines the subcarriers to generate the pulse waveforms. In another aspect of the invention, the pulse generator 403, or the pulse generator 403 and subcarrier-allocation circuit 401 together, may be implemented with a digital filter (not shown).

The subcarriers may be provided with modulation in the pulse generator 403. In one aspect of the invention, each pulse is modulated with data prior to processing by the sliding window transform 405. In another aspect of the invention, subcarriers provided to the pulse generator are modulated with information in the subcarrier-allocation circuit 401. In other applications of the invention, a modulator (not shown) may be coupled between the subcarrier-allocation circuit 401 and the pulse generator 403 or between pulse generator 403 and the sliding window transform 405. The sliding window transform 405 provides time-offsets to the pulse waveforms to produce a sequence of signals, such as shown in FIG. 3B. Alternatively, the pulse generator 403 and the sliding window transform 405 may be adapted to produce block transmissions.

Figure 4B:
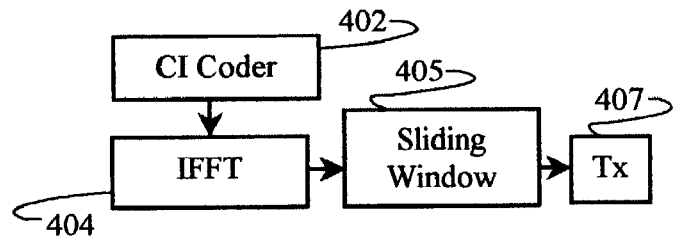
FIG. 4B illustrates a particular transmitter implementation.

In FIG. 4B, a transmission system includes a CI coder 402, an IFFT module 404, a sliding window transform 405, and a transmitter 407. The IFFT module 404 performs a frequency-domain to time-domain conversion of input sub-carrier weights to produce a pulse waveform. The CI coder 402 provides sub-carrier weights to the IFFT module 404 to shape the pulse waveform, as well as provide sub-carrier selection (i.e., allocation).

Multipath effects can cause inter-symbol interference (ISI), particularly in sliding-window transmissions. Accordingly, a preferred embodiment of the invention involves selecting pulse waveforms and/or sub-carrier components that reduce ISI. In one aspect of the invention, the time interval between windows is selected such that ISI resulting from a particular pulse is limited to nearby pulses. This reduces the numbers of signals contributing to ISI for each pulse, thereby simplifying interference cancellation, such as may be implemented via multi-user detection.

Figure 4C:
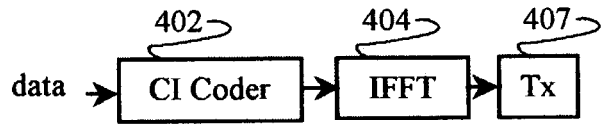
FIG. 4C shows a transmitter with a CI coder adapted to generate sliding-component inputs (i.e., time varying sub-carrier values adapted to produce sliding pulse waveforms) to a frequency-domain to time-domain converter (e.g., an IFFT).

In FIG. 4C, a sliding invertible transform is implemented by a sliding CI coder 402 and an invertible transform, such as an IFFT 404. The sliding CI coder 402 generates sliding sub-carrier weights (i.e., time-varying weights indicative of overlapping modulated pulse-waveform components) that are provided to the IFFT 404. Sliding pulse waveforms are coupled to a transmitter 407 for transmission into a communication channel.

Figure 4D:
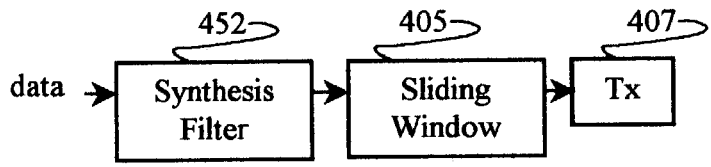
FIG. 4D shows a sliding-window transmitter of the invention implemented with a synthesis filter adapted to generate pulse waveforms. The synthesis filter may perform an interpolation function characterized by a superposition of selected subcarriers.

FIG. 4D illustrates components of a sliding window CI transmitter. A synthesis filter 452, which may be implemented with one or more digital filters, is adapted to generate a plurality of pulse waveforms characterized by a spectrum of predetermined orthogonal sub-carrier frequencies. The filter 452 may include a modulator (not shown) adapted to impress data symbols onto the pulse waveforms. A sliding-window module 405 is configured to provide an overlapping sequence of the modulated pulse waveforms. A transmission system 407 may be implemented for coupling the sequence into a communication channel.

Figure 4E:
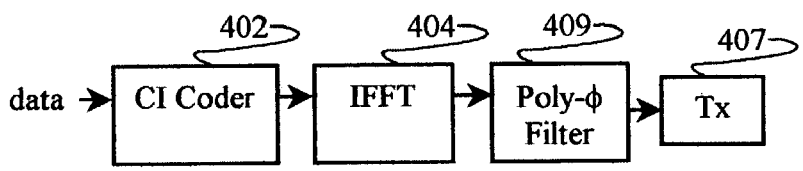
FIG. 4E illustrates a set of embodiments of a CI transmitter.

FIG. 4E illustrates a CI transmitter that includes a CI coder 402, an IDFT (such as IFFT 404), a polyphase filter 409, and a transmission system 407. The CI coder 402 is adapted to map multiple input data symbols onto a plurality of subcarriers. This is achieved via CI coding. The IFFT 404 is adapted to receive the plural sub-channel signals and transform them into plural time-domain signals. The polyphase filter 409 receives the time-domain signals and outputs a plurality of filtered signals. The polyphase filter 409 may be adapted to provide the filtered signals with a predetermined spectral profile of selected subcarriers. Polyphase filters operate by multiplying selected phases, or samples, of a filter impulse response with samples of one or more input signals.

Figure 4F:
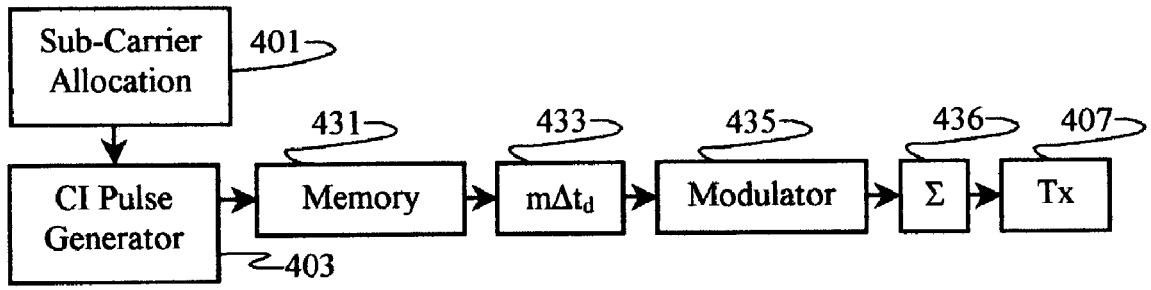
FIG. 4F illustrates an alternative CI transmitter design.

In FIG. 4F, a pulse generator 403 generates one or more pulses having predetermined sub-carrier components selected by a subcarrier-allocation module 401. The pulses are stored in a memory module 431. Pulses retrieved from the memory 431 are provided with predetermined time offsets in a delay module 433 to generate a sequence of overlapping pulse waveforms. A modulator 435 impresses data onto each pulse prior to combining in a combiner 436.

Figure 4G:
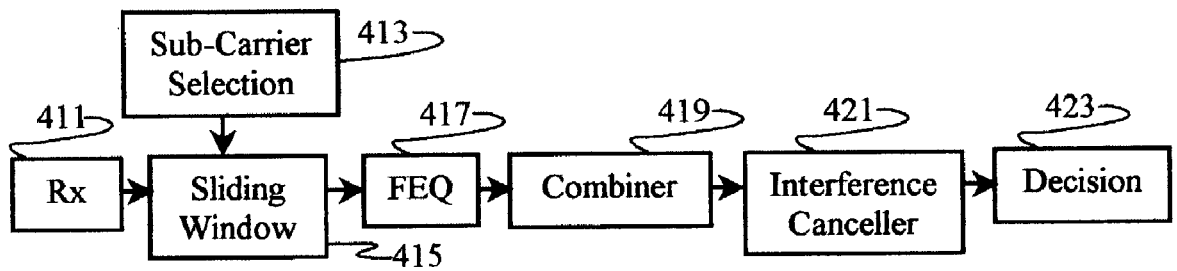
FIG. 4G shows basic components of a sliding-window CI-based receiver.

FIG. 4G shows basic components of a sliding CI receiver, including a receiver system 411, a sliding window transform 415 with an associated sub-carrier selector 413, an FEQ 417, a combiner 419, an interference canceller 421, and a decision module 423. The receiver system 411 couples trans-mitted pulse waveforms from a communication channel and performs well known receiver-processing operations on the received signals. Receiver systems typically perform amplification, filtering, down conversion, gain control, and analog-to-digital conversion.

Digital received signals are processed in the sliding window transform 415, such as a sliding FFT. Output bins of the transform 415 are selected by the sub-carrier selector 413. The FEQ 417 provides the selected output bins with complex weights adapted to compensate for channel distortions, such as multipath fading. The combiner 419 is adapted to optimally combine the weighted subcarriers to recover data symbols modulated on the transmitted pulse waveforms. The combiner 419 is typically adapted to provide one or more sets of CI sub-carrier weights corresponding to the CI phase space(s) of the pulse waveforms.

In a multipath environment, preceding pulse waveforms can cause ISI in a particular pulse waveform. The interference canceller 421 may be adapted to perform one or more types of interference cancellation to compensate for ISI. Multi-user detection techniques typically involve combining samples of neighboring waveforms to cancel ISI resulting from delayed reflections of those waveforms. Other weight-and-sum techniques may be implemented for interference cancellation. It is preferable to select pulse characteristics, such as pulse spacing and/or pulse-waveform duration, to reduce the effects of ISI. In some cases, guard intervals may be employed. If the sources of ISI include only a small number of preceding pulse waveforms, multi-user detection can be implemented with low complexity.

In an alternate embodiment of the invention, the interference canceller 421 consists of a time-domain equalizer (not shown). Time domain channel equalizers are well known in the field of multicarrier receivers. For example, time-domain equalizers are shown in N. Al-Dhahir and J. M. Cioffi, "Optimum Finite Length Equalization for Multicarrier Transceivers," *IEEE Trans. on Comm.*, pp. 56-64, January 1996 and in J. S. Chow and J. M. Cioffi, "A cost-effective maximum likelihood receiver for multicarrier systems," *Proc. IEEE Int. Conf. On Comm.*, pp. 948-952, June 1992, which are incorporated by reference.

Figure 4H:
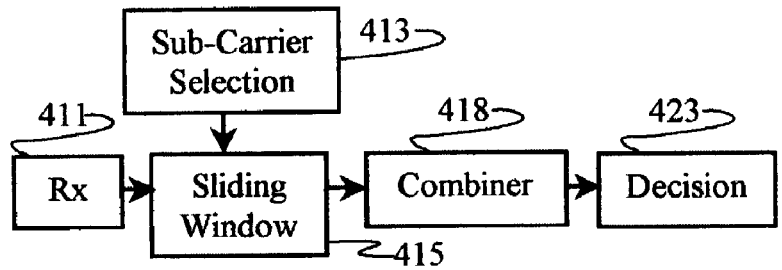
FIG. 4H shows basic components of a CI receiver adapted to perform successive interference cancellation.

SIC may optionally be applied to sub-carrier processing. For example, SIC may be employed to calculate data symbols modulated onto sub-carrier components of the transmitted pulse waveforms. For example, the receiver illustrated in FIG. 4H shows a combiner 418 adapted to compensate for multipath fading and ISI. Thus, the combiner 418 may perform equalization, combining, and ISI cancellation. In this case, the combiner 418 is an SIC processor adapted to process the subcarriers.

In some applications of the invention, receiver systems, such as receiver system 411, may include multiple antenna elements. Accordingly, receivers of the invention may be adapted to perform sub-space processing. Methods and systems of the invention may spread data symbols across multiple frequency bins and/or subspaces. Spreading may be performed by channel coding and/or multiple-access coding. Therefore, receivers of the invention may provide for decoding (e.g., despreading) symbols modulated across multiple subspaces and/or frequency bins.

Figure 4I:
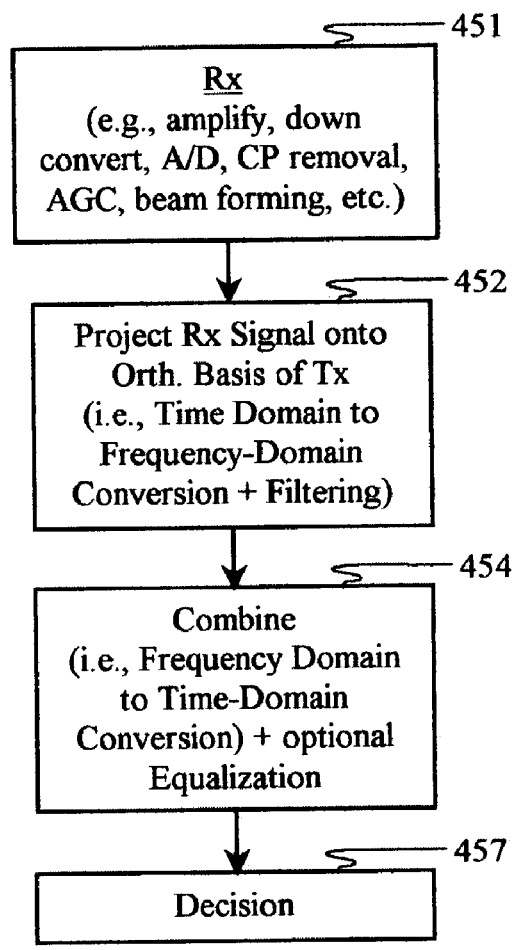
FIG. 4I illustrates a CI reception method and apparatus.

FIG. 4I illustrates a CI reception method that implies an apparatus for carrying out the method. A receiver step 451 processes transmissions from a communication channel to generate received signals. Time-domain to frequency-domain conversion and filtering the resulting frequency-domain signal is achieved by projecting the received signal onto an orthonormal basis of the transmitted signals (such as indicated by a projection step 452). Projecting a received multicarrier signal onto an orthonormal basis of a particular user's transmitted signal produces frequency-domain signal components $r=(r_0, r_1, \ldots, r_{N-1})$ corresponding to that user's assigned subcarriers. Equivalently, the projection of a received signal onto an orthonormal basis excludes signals (e.g., carriers and/or phase spaces) that do not correspond to that orthonormal basis.

Frequency-domain to time-domain conversion is achieved by combining 454 the received frequency-domain components produced by either band-pass filtering or projection onto a predetermined orthonormal basis. The combined frequency-domain components produce a time-domain signal. The step of recovering symbols is provided in the decision process 457.

Figure 4J:
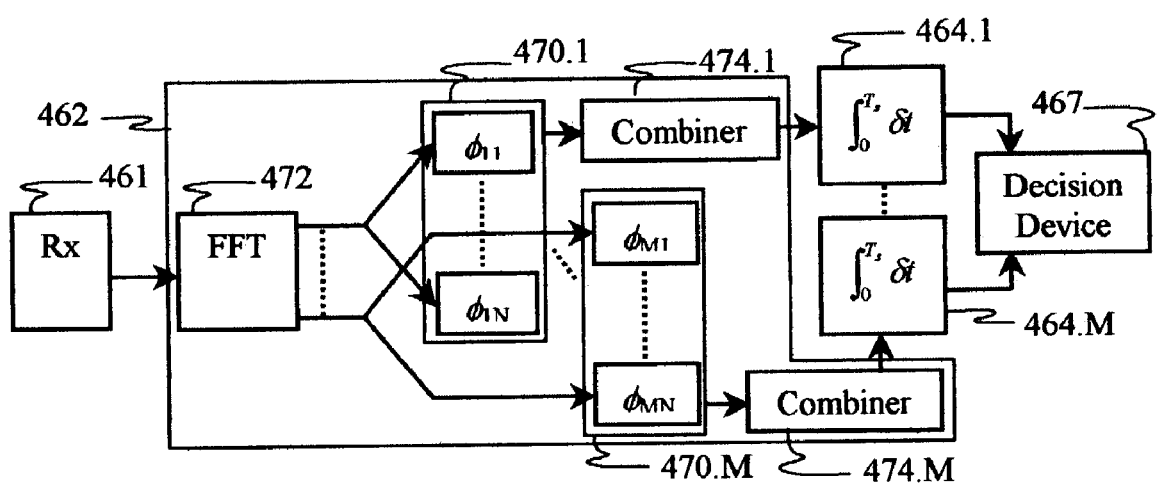
FIG. 4J shows a CI receiver adapted to project a received signal onto at least one orthonormal basis, such as an orthonormal basis corresponding to at least one transmitted signal.

FIG. 4J illustrates a CI receiver including a receiver module 461, a matched filter or projection module 462, a plurality M of integrators 464.1 to 464.M, and a decision device or module 467. The projection module 462 includes a DFT, such as an FFT 472. Equivalently, other types of filters may be included, such as to select one or more sub-carrier components allocated to a particular user. N frequency-domain components generated by the FFT 472 are phase shifted by a plurality M of phase-shift systems (e.g., interval-delay systems) 470.1 to 470.M. The N signal components corresponding to each phase-shift system 470.1 to 470.M are combined in an associated combiner 474.1 to 474.M to generate a time-domain signal.

A plurality M of time-domain signals is output from the projection module 462. Each of the M time-domain signals is integrated over each symbol interval $T_s$ by the integrators 464.1 to 464.M. Signal values generated by the integrators 464.1 to 464.M are processed by the decision module 467 to generate a sequence of estimated data symbols.

Various embodiments of the invention may include variations in system configurations and the order of steps in which methods are provided. For example, the order of frequency-domain combining (illustrated by the combiners 474.1 to 474.M) and time-domain combining (illustrated by the integrators 464.1 to 464.M) may be switched. Multiple steps and/or multiple components may be consolidated.

Figures 5A, 5B:
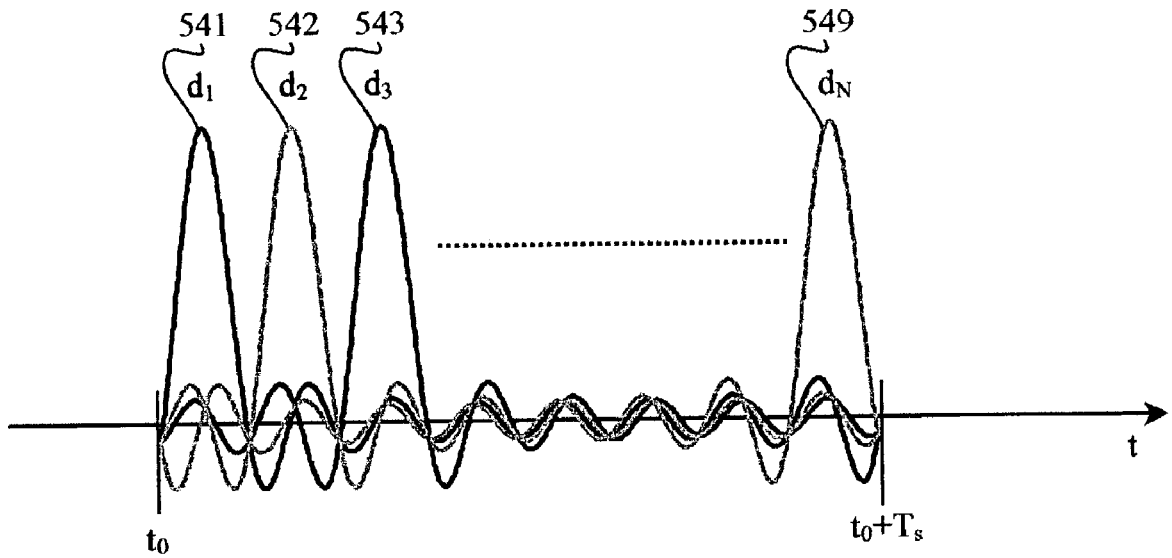
FIG. 5A illustrates a block waveform including a set of orthogonal CI pulse waveforms.
FIG. 5B illustrates a method for generating sub-carrier weights from a set of data symbols and a CI code matrix.

FIG. 5A illustrates a block waveform including a set of N orthogonal CI pulse waveforms 541 to 549 having a duration of $T_s$. CI pulse waveforms (such as pulse 541 to 549) may be generated from a superposition of orthogonal subcarriers. Each of the pulse waveforms 541 to 549, which represents a CI phase space, is modulated with one of a plurality of data symbols $d_1$ to $d_N$, respectively. In one aspect of the invention, each data symbol $d_1$ to $d_N$ includes a code chip of an orthogonal code, such as Hadamard-Walsh (Walsh) code or a Walsh code multiplied by a long code. Pseudo-orthogonal coding may be employed. Other codes, including Gold codes, Barker codes, Kasami codes, CI codes, and/or DeBot codes, may be modulated onto the pulses 541 to 549. The sub-carrier weights resulting from the application of these time-domain codes provide orthogonal or pseudo-orthogonal CI codes expressed as frequency-domain codes, which are characterized by low PAPR in multi-carrier synthesis.

FIG. 5B illustrates a plurality of CI sub-carrier weights $w_1$ to $w_N$ generated from a set of data symbols $d_1$ to $d_N$ mapped to a number N of orthogonal CI phase spaces. A CI code matrix of dimension N×N containing polyphase code chips is multiplied by a set of data vectors or a data matrix. In particular, each column of the CI code matrix (such as column 551) is multiplied by a corresponding data symbol (such as symbol $d_2$). In some cases, the CI code matrix and an N×N data matrix (not shown) may be provided with an element-by-element multiplication. Each row of a product matrix resulting from the product of the data symbols $d_1$ to $d_N$ with the CI code matrix are summed together to produce the sub-carrier weights $w_1$ to $w_N$. For example, elements in row 553, after multiplication by the data symbols $d_1$ to $d_N$, are summed to generate weight $w_2$. Since rows and columns of the basic CI code matrix resemble the vectors of complex values used in DFTs, the sub-carrier weights $w_1$ to $w_N$ can be calculated using a fast transform algorithm.

If the data symbols $d_1$ to $d_N$ include an orthogonal code, such as a Walsh code, the subcarrier weights $w_1$ to $w_N$ also represent an orthogonal code. If an orthogonal code is modulated onto orthogonal pulse waveforms (i.e., orthogonal time-domain waveforms), then a set of sub-carrier weights applied to orthogonal sub-carriers to synthesize the code-modulated time-domain waveforms also belongs to a family of orthogonal codes. In particular, Walsh codes (which are binary-phase codes) can be represented by orthogonal CI subcarrier weight codes that can be characterized as polyphase/poly-amplitude codes.

Conventional orthogonal codes and basic CI codes (such as represented by the CI code matrix shown in FIG. 5B) are constant-modulus codes. These codes uniformly distribute data symbols and communication channels across the communication resources, such as time-domain pulses, subcarriers, subspaces, etc. Thus, receiver decoding typically uses optimal combining to optimize performance in a multipath environment. Unless different propagation channels are provided to different multiple-access channels (such as may be employed with antenna arrays used in space-time processing), the proportions of received multiplexed signals are uniform across the communication resources.

In MC-CDMA, Walsh coding in a particular transmitter spreads a plurality of data symbols across a common set of subcarriers. Even if the subcarriers experience different fades, the proportions of different data symbols received on each subcarrier are the same. Thus, optimal combining, rather than the better performing SIC algorithms, must be performed. Alternatively, the present invention provides for generating orthogonal codes having poly-amplitude characteristics, which enable receivers to employ interference cancellation, such as SIC algorithms.

CI transmissions in an N-carrier system are characterized by N flat-fading channels. A received N×1 vector $r=(r_1, \ldots, r_N)^t$ is expressed by equation:

$$r = Ms + N_o$$

where $s=(s_1, \ldots, s_N)^t$ represents a vector of transmitted symbols modulated on the N carriers, $N_o=(n_1, \ldots, n_N)^t$ represents additive noise, and matrix M is a product of an N×N CI code matrix and a diagonal matrix of carrier attenuations.

Sequential detection of a received signal set starts with Wiener equalization of matrix M using matrix G expressed by:

$$G = (M^H M + \sigma^2 I)^{-1} M^H$$

The carrier (e.g., an $n^{th}$ carrier) having the highest SNIR is decoded first. The resulting estimated symbol $s_{n(est)}$ is subtracted from the vector of received signals r to generate a new received signal vector r':

$$r' = r - s_{n(est)} m_n$$

where $m_n$ expresses an $n^{th}$ column of matrix M. This process is repeated for the carrier having the next highest SNIR until all elements of the received signal vector r are processed.

For each successive carrier, a modified Wiener matrix G is employed in which columns of matrix M corresponding to each $n^{th}$ carrier (i.e., carriers corresponding to estimated symbol(s) $s_{n(est)}$) are zeroed.

Figure 6A:
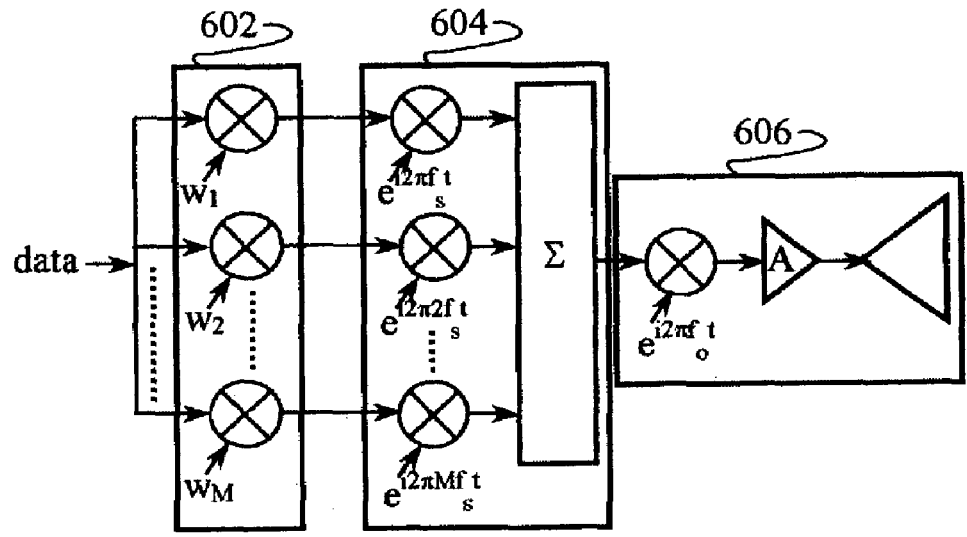
FIG. 6A illustrates a transmitter apparatus and method of the invention configured to generate multiple transmission waveforms.

FIG. 6A illustrates transmitter apparatus and method embodiments of the present invention. An input data stream is serial-to-parallel converted and processed in a subcarrier-weighting module 602. The weighting module 602 provides one or more orthogonal poly-amplitude codes to the sub-carriers. The codes may also be characterized by polyphase values. The codes are typically indicative of the data and are used as sub-carrier weights. In this case, block codes are provided. The weights may be used to synthesize at least one predetermined direct-sequence (e.g., DSSS or DS-CDMA) waveform. The weights are converted to at least one time-domain waveform in a frequency-domain to time-domain converter 604, such as an inverse Fourier transform.

The time-domain output of the converter 604 is processed in a transmission system 606, which may optionally provide a guard interval or cyclic prefix (and/or postfix), perform digital-to-analog conversion, up convert the signal, provide amplification, optionally filter the signal, and provide for coupling the signal into a communication channel. Other transmitter-side signal-processing operations may be provided, including MIMO (e.g., array) processing. This transmitter embodiment of the invention may be adapted to generate multi-carrier signals configured to appear as a single-carrier signal in the time domain.

Figure 6B:
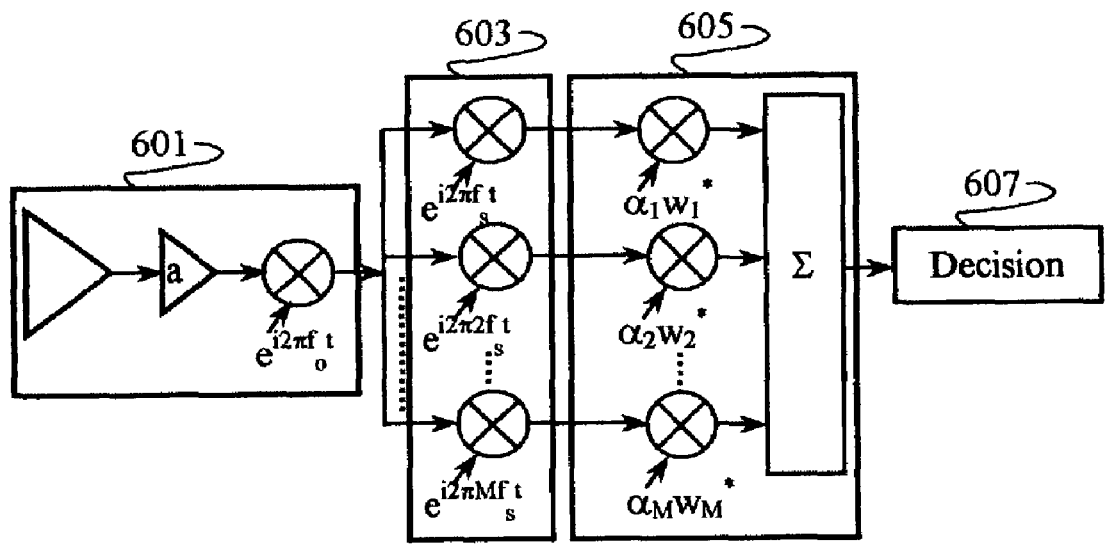
FIG. 6B shows a receiver apparatus and method of the invention adapted to process a wide range of single-carrier and/or multi-carrier transmissions.

FIG. 6B shows a receiver apparatus and method of the invention. A receiver system 601 couples single-carrier and/or multi-carrier transmissions from a communication channel, and adapts the received signals for baseband or IF processing. In particular, the receiver system 601 may perform filtering, amplification, down conversion, analog-to-digital conversion, cyclic-prefix removal, and/or other receiver processing operations that are well known in the art. The receiver system 601 may be adapted to perform MIMO (e.g., array) processing. A received signal is separated into a plurality of orthogonal sub-carrier components by a time-domain to frequency-domain converter 603, such as a Fourier transform. Frequency-domain equalization and decoding of the orthogonal poly-amplitude codes is performed in a combiner 605. The combiner 605 multiplies the frequency bin values output by the converter 603 with a complex conjugate of at least one of poly-amplitude code. A decision module 607 is adapted to process the combined signal values using any combination of hard-decision and soft-decision processing.

In one aspect of the invention, a received signal for at least one user is separated into orthogonal frequency components. Channel compensation (e.g., equalization) and combining are performed to provide estimates of the transmitted symbols. ISI may be compensated via any combination of equalization and multi-user detection. While numerous combining techniques may be implemented in the invention, it has been shown in S. Hara and R. Prasad, "Overview of multicarrier CDMA", IEEE Comm. Mag., Vol. 35, no. 12, pp. 126-133, December 1997, which is incorporated by reference, that MMSEC provides the best performance.

Embodiments of the invention may employ any of a number of techniques for providing channel estimating. For many of these methods, a block of pilot chips, tones, or other known signals may be inserted into the transmitted waveform. Known symbols may be mapped to CI phase spaces. Training symbols may be provided to individual subcarriers. In other embodiments, various types of coded training symbols may be transmitted. Blind adaptive estimation and equalization may be employed.

FIG. 7A shows a block diagram illustrating a transmission method of the invention. A code matrix generation step 710 provides for generating a direct sequence code matrix (such as a Walsh matrix) and a CI code matrix. A time-domain to frequency-domain conversion 713 of the direct-sequence code is provided. For example, the direct-sequence code matrix is processed with the CI code matrix to generate a poly-amplitude code that is employed as a set of sub-carrier weights. The conversion step may be performed by an invertible transform and may employ a fast processing algorithm, such as an FFT. One or more data symbols may be processed in the conversion step 713 to produce data-modulated sub-carrier weights.

The weights are provided to a plurality of predetermined (e.g., selected or allocated) subcarriers in a sub-carrier selection/modulation step 714. Step 714 may include a frequency-domain to time-domain transform, such as an IDFT or IFFT. Data modulation may be provided during or following step 714. Step 714 produces a modulated time-domain signal that may be shaped to appear as a single-carrier signal, such as a direct-sequence signal. An optional cyclic prefix prepending step 715 may be provided. A transmission step 716 adapts time-domain signal for transmission into a communication channel.

The use of a cyclic prefix in multi-carrier communications is well known. For example, in J. van de Beek, "On Synchronization in OFDM Systems Using the Cyclic Prefix," Proc. Radio Vetenskaplig Koferens, pp. 663-667, June 1996, which is incorporated by reference, cyclic prefixes in common Discreet Multitone Systems consist of a copy of a number of samples at the end of a symbol being prepended to the beginning of the symbol. Similarly, the use of a cyclic prefix in single-carrier modulation is well known, such as described in A. Czylwik, "Comparison between adaptive OFDM and single carrier modulation with frequency domain equalization," VTC, pp. 865-869, Phoenix, 1997, which is incorporated by reference. Various types of guard intervals are well known in the art and may be employed by the invention. The symbol duration $T_s$ may be provided with extra length to compensate for delay spread. A cyclic redundancy may be added to the end of a symbol block. A cyclic redundancy may be split between a cyclic prefix and a cyclic postfix. Zero values may be provided to the guard intervals.

FIG. 7B shows a detailed embodiment of a CI-based transmitter. A matrix-generation step 711 provides for the generation of a direct-sequence (e.g., Walsh) matrix ($HW_{matrix}$) and a CI matrix (CI). For a predetermined number N of subcarriers, the CI and direct-sequence matrices are square matrices of dimension N×N. A code-selection 712 is provided in which one or more direct sequence code vectors ($HW_{vector}(i)$) indexed by i are selected from the direct-sequence matrix ($HW_{matrix}$).

Time-domain to frequency-domain conversion 713 includes generating at least one new direct-sequence matrix ($HW'_{vector}(i)$) 721 by stacking N copies of direct-sequence vector $HW_{vector}(i)$. This is repeated for each index. A product matrix ($Prod_{HWCI}(i)$) is generated from an element-by-element multiplication 722 of the new direct-sequence matrix ($HW'_{matrix}(i)$) with the CI matrix (CI). Row summation 723 produces a vector of sub-carrier weights PCI(j) from a sum of elements in each row of the product matrix ($Prod_{HWCI}(i)$). Sub-carrier modulation 714 may employ an invertible transform, such as an IFFT.

Data symbols may be modulated onto the subcarriers by introducing a data-modulated matrix in step 711, modulating the selected code(s) with one or more data symbols in step 712, introducing data modulation into step 713, or modulating the sub-carrier weights prior to sub-carrier modulation 714. Alternatively, the time-domain signal output by the subcarrier-modulation step 714 may be directly modulated with data.

FIG. 7C illustrates a method of receiving single-carrier or multi-carrier signals, including providing for receiver-system processing 751 of received signals, performing a time-domain to frequency-domain conversion 753 of the received signals to produce a plurality of orthogonal sub-carrier values, providing for frequency-domain-equalization 755 of the sub-carrier values, providing for CI decoding 757 (which includes combining), and providing for decision processing 759.

Figure 7D:
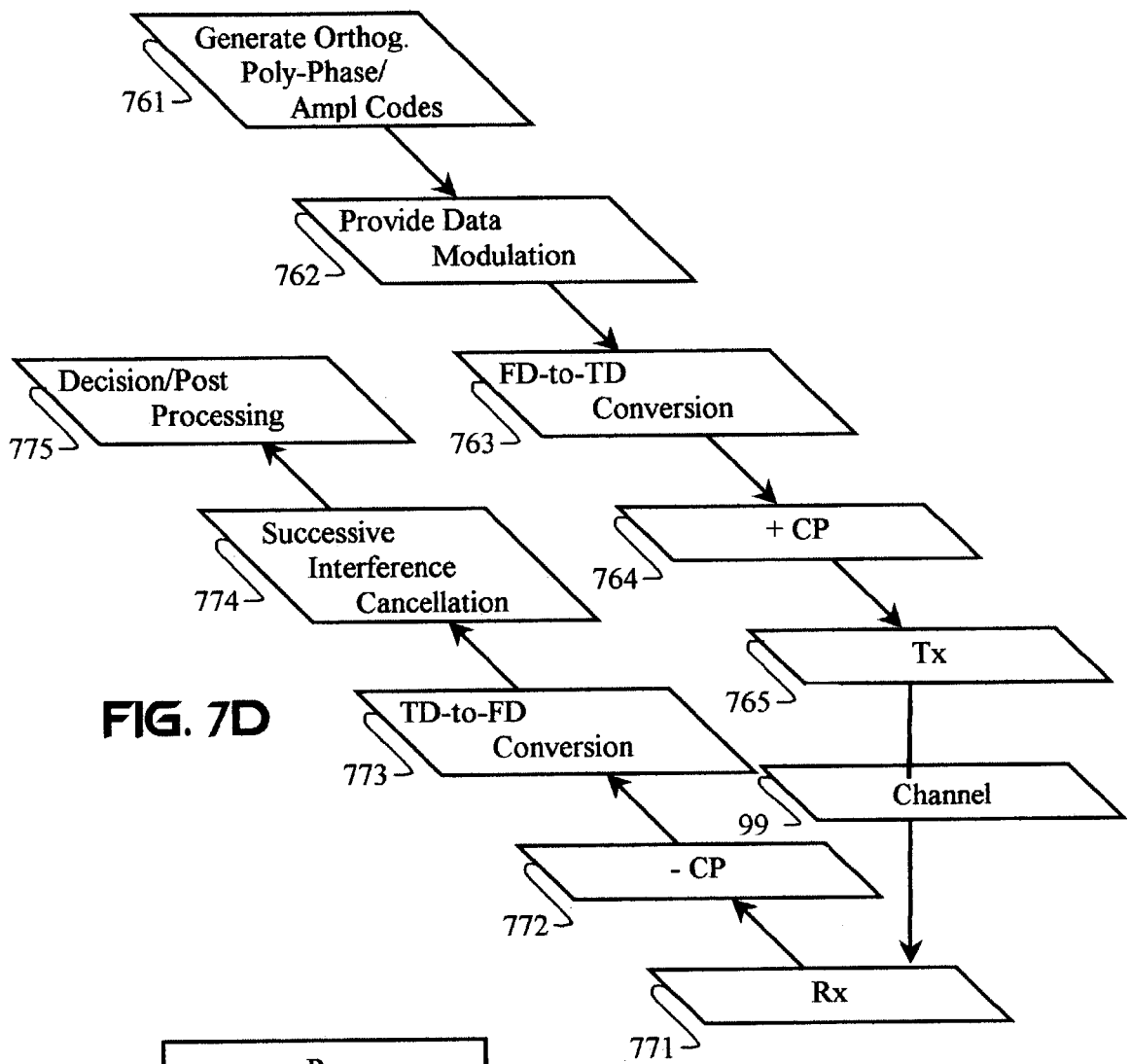
FIG. 7D illustrates a communication method of the invention.

FIG. 7D illustrates a communication method of the invention. A plurality of orthogonal poly-amplitude codes are generated 761 in a transmitter. The codes are modulated 762 with different data symbols. A-frequency-domain to time-domain conversion 763 of the modulated codes is provided to generate a time-domain output. A cyclic prefix or guard interval is optionally prepended 764 to the time-domain output, followed by transmission processing 765 adapted to process the signal for transmission into a communication channel 99.

A receiver process 771 couples the transmission from the channel 99 and performs receiver system processes typically performed to convert a received signal to a digital or analog baseband or IF signal. An optional cyclic-prefix removal 772 may be performed as necessary prior to time-domain to frequency-domain conversion 773. Interfering frequency-domain signals are separated in an interference-cancellation process 774, which may optionally employ frequency-domain and/or time-domain equalization. Separated signal values are then post processed, which may include decision processing 775.

Figure 7E:
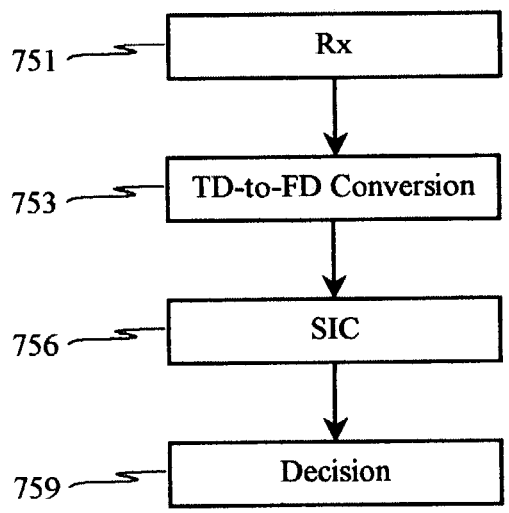
FIG. 7E illustrates a receiver method of the invention.

FIG. 7E illustrates a receiver method of the invention. Single-carrier and/or multi-carrier transmissions are processed in a receiver step 751. Time-domain to frequency-domain conversion 753 is performed on received signals to generate orthogonal sub-carrier (i.e., spectral) components characterized by a plurality of data-modulated orthogonal poly-amplitude codes. The coded modulations are processed via SIC 756 prior to decision processing 759.

Figure 8:
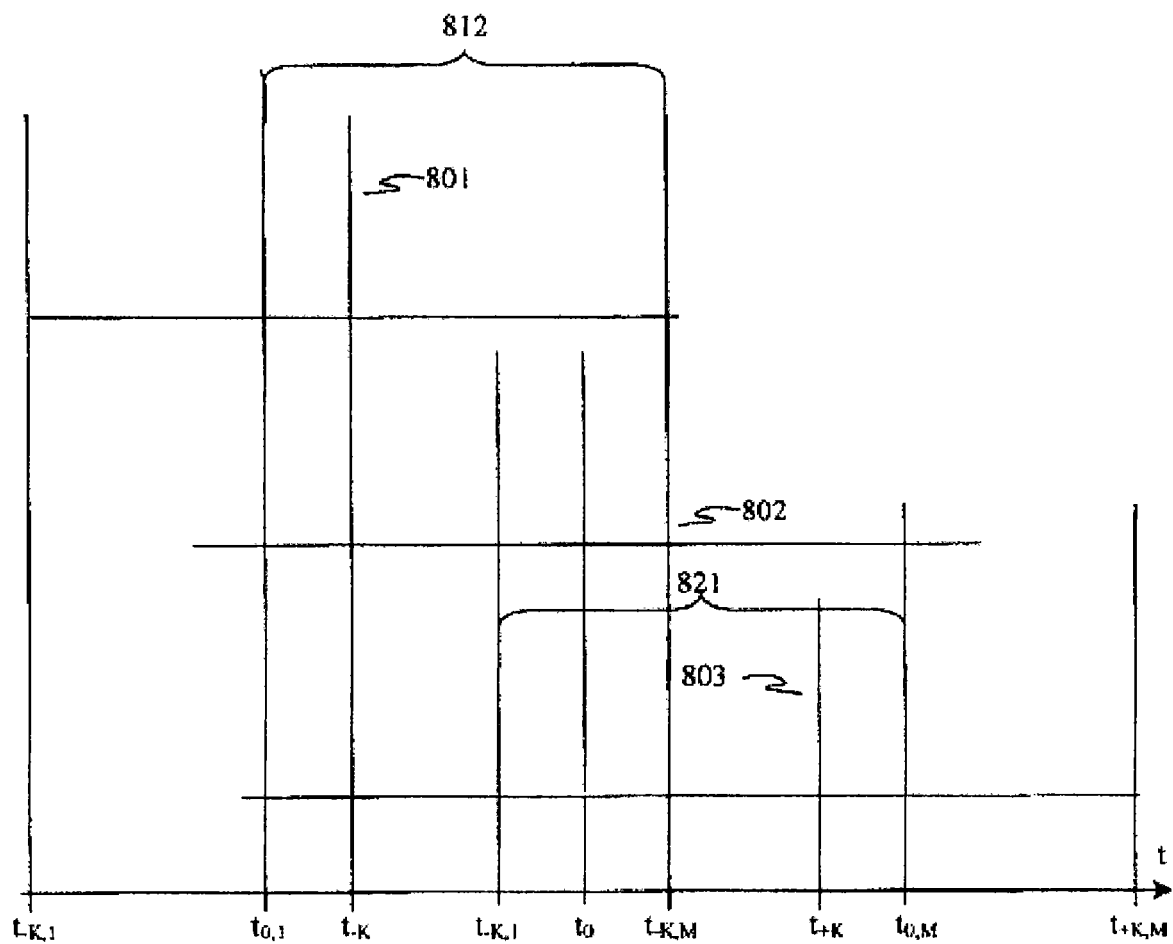
FIG. 8 illustrates contributions of multiple time-offset waveforms in a particular window of a sliding Fourier transform.

FIG. 8 illustrates a window in a sliding Fourier transform. In this case, a predetermined number N of samples corresponds to the window duration. A first pulse waveform 802 having a pulse width of a number P of samples is centered in the window at center time $t_0$. At least one pulse waveform (such as pulse waveform 803) is centered at a later time $t_{+K}$ (i.e., to the right of center time $t_0$). In this case, center time $t_{+K}$ is located at K pulse positions to the right of center time $t_0$. At least one pulse waveform (such as pulse waveform 801) is centered at an earlier time $t_K$ relative to the center time to of the first pulse 802.

Each of the pulse waveforms, such as pulse waveform 802, has duration $T_{0,M}-T_{0,1}=T_s$. A DFT window of duration $T_s$ centered at time $t_0$ spans time $t_{0,1}$ to $t_{0,M}$. A portion 812 of waveform 801 occurs within the DFT window. Similarly, a portion 821 of waveform 803 occurs within the DFT window.

A DFT (such as that which may be implemented via any appropriate FFT algorithm) corresponding to a particular window may be represented by corresponding Fourier transforms of individual waveforms (including waveform segments) that occur within the window. This representation may be employed as the basis of signal synthesis (i.e., signal generation) and/or signal analysis (i.e., signal reception) techniques of the present invention.

In the particular example illustrated by FIG. 8, sub-carrier weights $X_k(f_n)$ corresponding to a particular sub-carrier frequency $f_n$ for each of the pulse waveforms k=−K, 0, +K is represented as follows:

$$X_{-K}(f_n) = \sum_{m=KP}^{M-1} x_{-K}(m\Delta t)e^{-i2\pi f_n(m-KP)\Delta t}$$

$$X_0(f_n) = \sum_{m=0}^{M-1} x_0(m\Delta t)e^{-i2\pi f_n m\Delta t}$$

$$X_{+K}(f_n) = \sum_{m=0}^{M-1-KP} x_{+K}(m\Delta t)e^{-i2\pi f_n(m+KP)\Delta t}$$

The total sub-carrier weight $X_T(f_n)$ for frequency bin $f_n$ can be expressed by a sum of the sub-carrier weights $X_k(f_n)$:

$$X_T(f_n)=X_{-K}(f_n)+ \ldots +X_0(f_n)+ \ldots +X_{+K}(f_n)$$

In this case, −K is the number of pulse widths preceding the window center time $t_0$, +K is the number of pulse widths following the window center time $t_0$, $\Delta t$ is the time interval between samples, and P is the number of samples in a pulse width.

A data symbol do modulated onto the pulse waveform 802 is expressed by the DFT as a set of equal-magnitude polyphase subcarrier weights. Similarly, each data symbol modulated on the other pulses (such as pulse waveforms 801 and 803) is also expressed by the DFT as a set of equal-magnitude polyphase sub-carrier values. However, varying proportions of the pulse waveforms (such as pulse waveforms 801, 802, and 803) in the DFT window result in different proportions of data in the subcarrier values. The proportions of data vary for different DFT windows. Thus, multi-stage cancellation, such as SIC or multi-user detection, may be performed to separate the interfering data symbols on the subcarriers. Other forms of sub-space processing may be employed to separate the data symbols.

In the case illustrated in FIG. 8, the pulse waveforms (such as pulse waveforms 801, 802, and 803) have durations equal to the window duration $T_s$. However, different pulse waveform durations or window durations may be employed. In one aspect of the invention, windows are selected to be longer or shorter than the pulse waveform duration $T_s$. Although one pulse waveform 801 is shown centered to the right of (i.e., following) time $t_0$ and one pulse waveform 803 is shown centered to the left of (i.e., preceding) time to, different numbers of pulse waveforms (as well as different time offsets) may be implemented by the present invention. In some cases, the number of preceding and following pulse waveforms may differ. For example, the beginning of a data packet typically has few or zero preceding pulse waveforms. Similarly, the end of a packet typically has few or zero following pulse waveforms. Some pulse waveforms within a packet may effectively be zeroed. The time offsets (e.g., $t_0-t_{-K}$ and $t_{+K}-t_0$) may include integer and/or half-integer pulse widths. Other time offsets may be provided.

Figure 9:
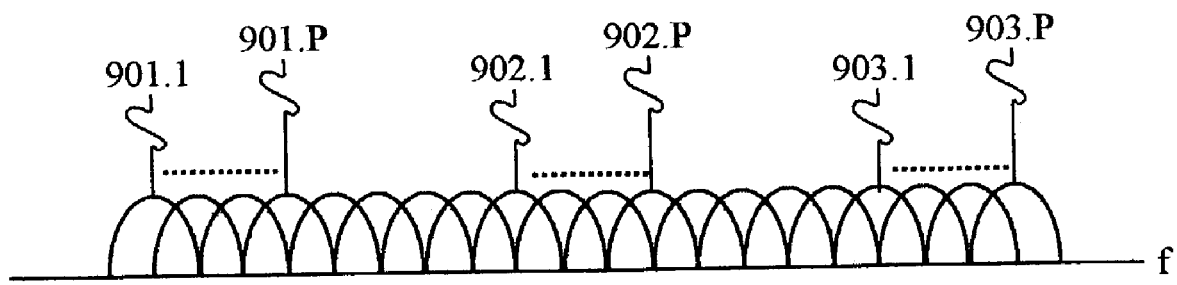
FIG. 9 illustrates an exemplary allocation of sub-carrier frequencies in accordance with one aspect of the invention. In a resource-limited system, subcarriers are allocated to new users in a network until no subcarriers are available. In an interference-limited system, new users are allocated subcarriers previously allocated to other active users.

FIG. 9 illustrates an exemplary allocation of sub-carrier frequencies in accordance with one aspect of the invention. Each of a plurality P of users is assigned a predetermined set of subcarriers wherein the sub-carrier frequencies span much of the available spectrum. A first set of subcarriers assigned to a first user includes subcarriers 901.1, 902.1, and

903.1. Similarly, a different set of subcarriers allocated to a $P^{th}$ user includes subcarriers 901.P, 902.P, and 903.P. In this case, the subcarriers are uniformly distributed throughout a predetermined frequency band. Other distributions may be employed depending on spectrum use, channel conditions, network configuration, interference, etc.

The division of the total transmission band into sub-bands allows for lower sampling rates and less intensive digital signal processing requirements because the processed band is spread over a significantly smaller bandwidth. Superior frequency diversity is achieved without additional processing gain. The application of orthogonal or pseudo-orthogonal CI coding ensures a low PAPR.

In conventional resource-limited communication architectures, users access the network only when spectrum resources (i.e., subcarriers) are available. This is analogous to providing only orthogonal multiple-access codes. Pseudo-orthogonal coding permits an interference-limited sharing of the spectrum resources, which provides a gradual degradation of the channel.

A simple frequency-domain pseudo-orthogonality may be provided in a CI system by allocating subcarriers to a particular user that are already allocated to a plurality of other users. For example, a new user to the network may be allocated subcarriers 901.1, 902.2, . . . , 903.P. The interference from other users will tend to be non-coherent whereas the pseudo-orthogonal user's signals combine coherently. Furthermore, the new user's signal will suffer more interference than the other user transceivers, which experience interference only on a subset of their allocated subcarriers. This coding technique, unlike conventional pseudo-orthogonal coding, allows a seamless transition between orthogonal and pseudo-orthogonal coding. This coding also allows a network to provide multiple QoS levels by determining which users get pseudo-orthogonal codes and which users have their subcarriers allocated to pseudo-orthogonal code users.

Sub-carrier allocation in pseudo-orthogonal CI (POCI) coding coupled with appropriate network-control strategies can also improve performance, system capacity, and frequency-reuse. In one aspect of the invention, a user transceiver senses transmission powers over a set of subcarriers and transmits a request to the network controller (via one or more base stations) to use a particular set of subcarriers having low transmission powers. The low sub-carrier powers may be due to unused subcarriers, localized fading, and/or spatial separation between a source transmitter and the user transceiver. If a small number of these requests are made at one time (i.e., by a small number of transceivers, or only occasionally by a large number of transceivers), the resource and processing overheads can be minimized. The network controller responds by assigning base station/sub-carrier combinations for the user that may best serve the overall performance of the network. Network performance may include a measure of capacity, throughput, and/or signal quality, and may be weighted by different QoS or user priority levels.

In another aspect of the invention, POCI is employed by a network controller and one or more base stations. Subcarriers allocated to other users that are characterized by deep fades may be used instead to convey control information between base stations and users, or the subcarriers may be allocated to new users. Base stations and/or network controllers may allocate a particular set of subcarriers to a user based on the geographical (inter-cell, and/or, intra-cell) locations of other users employing those subcarriers. For example, it is desirable to minimize interference by reusing subcarriers shared by geographically distant users.

Figure 10A:
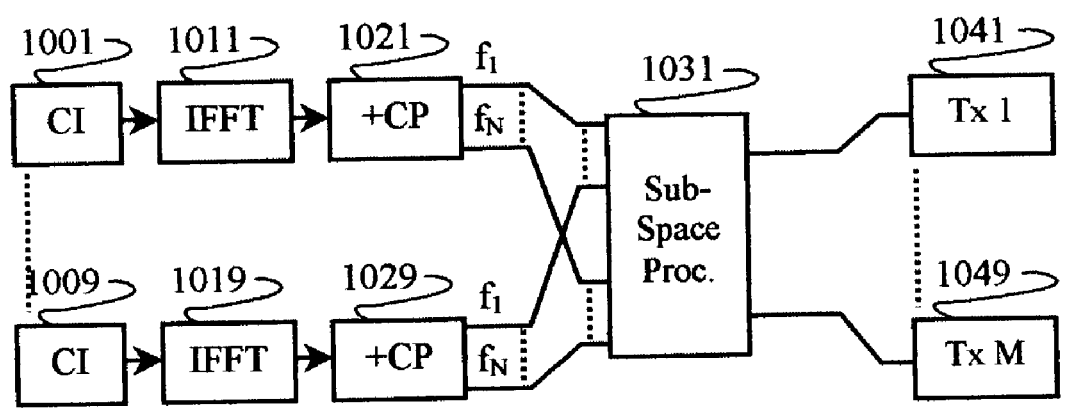
FIG. 10A illustrates a transmitter array processor of the present invention.

FIG. 10A illustrates a transmitter array processor of the present invention. The transmitter array may be adapted to provide multi-carrier synthesis of single-carrier signals, such as conventional direct-sequence signals and single-carrier signals with cyclic prefixes. In a first transmitter-processing branch, a CI coder 1001 receives a plurality of data symbols and generates one or more CI codes therefrom. CI codes may convey both CI coding and data values. The CI codes include orthogonal or pseudo-orthogonal frequency-domain codes, which may correspond to one or more time-domain waveforms. The CI codes are processed to provide a plurality of sub-carrier weights that convey the data-bearing CI codes to a sub-carrier generator, such as an IFFT 1011. The IFFT 1011 may include a sliding-window processor. Alternatively, the CI coder 1001 may be adapted to generate CI-encoded sliding code values in order to provide sliding-window functionality. An optional cyclic-prefix prepender 1021 is shown. A similar signal processing procedure is used for at least one more transmitter-processing branch, such as indicated by blocks 1009, 1019, and 1029, which correspond to blocks 1001, 1011, and 1021.

In direct-sequence transmitters, each data symbol is modulated by a particular Walsh code, and the set of active Walsh-code channels may be power controlled, summed, and spread by a long code. In one embodiment, the long code can be a pseudo-random code that may have the same chip spacing as the Walsh codes such that the long code acts simply as a scrambling code. In the frequency domain, orthogonal Walsh codes multiplied by the same long code are orthogonal. Different long codes provide for pseudo-orthogonal frequency-domain codes. In one aspect of the invention, long codes may be used to modulate time-domain signals generated from frequency-domain synthesis.

A sub-space processor 1031 is adapted to process signals from a plurality of transmitter-processing branches. The processor 1031 maps each sub-carrier value to a different spatial subspace. The resulting sub-space/sub-carrier combinations are processed in a plurality of transmitter systems 1041 to 1049 and coupled into a communication channel. In this case, the channel acts as a combiner that combines the sub-space/sub-carrier signals.

Figure 10B:
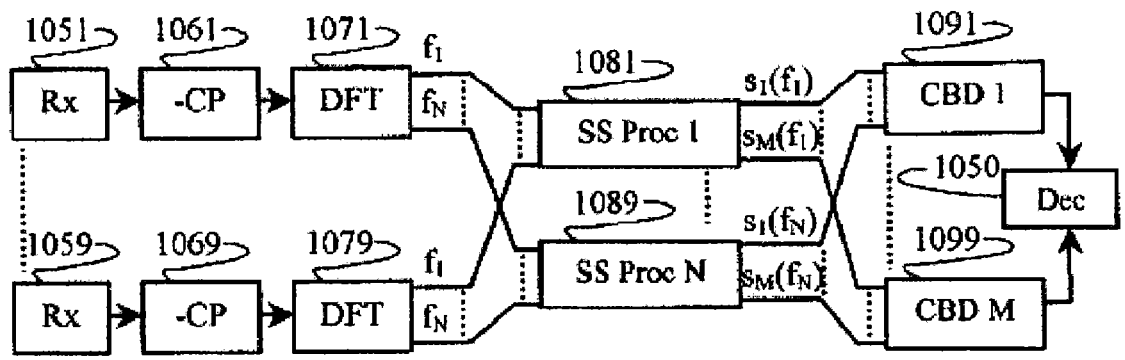
FIG. 10B illustrates a sub-space/sub-carrier processor receiver of the invention.

FIG. 10B illustrates a sub-space/sub-carrier processor receiver of the invention. A plurality M of receiver systems 1051 to 1059 is adapted to couple a plurality of interfering single-carrier or multi-carrier signals from a communication channel. M receiver branches are provided for frequency-domain analysis of received signals. Optional cyclic prefix removal modules 1061 to 1069 may be provided. A set of M time-domain to frequency-domain converters, such as DFTs 1071 to 1079 are adapted to separate received signals in each branch into a plurality N of sub-carrier values. Alternatively, sliding transforms, such as sliding FFTs (not shown), may be employed in place of the DFTs 1071 to 1079. Each of a plurality of sub-space processors 1081 to 1089 is adapted to process the sub-carrier values. For example, N sub-space processors 1081 to 1089 can process M signals at a time that were mapped into each of the N sub-carrier frequencies.

The output of each sub-space processor 1081 to 1089 is characterized by up to M sub-space values. Each of a plurality of CI decoders 1091 to 1099, such as CI block decoders or CI sliding window decoders, combine sub-carrier values corresponding to a particular subspace. In this case, each transmitter system 1041 to 1049 of an associated multi-element transmitter (such as the transmitter shown in FIG. 10A) is adapted to transmit one synthesized single-carrier signal. For example, each data symbol is transmitted by one transmitter system 1041 to 1049. In this case, each data symbol is mapped to a particular subspace (i.e., transmitter system 1041 to 1049). Alternatively, a plurality of single-element transmitters may generate the transmissions processed in the receiver. In each case, the application of orthogonal or pseudo-orthogonal CI coding to the subcarriers ensures low-PAPR transmissions. Signal outputs from the CI decoders 1091 to 1099 are processed in a decision module 1050 adapted to perform any combination of hard and soft decision processing.

Figure 10C:
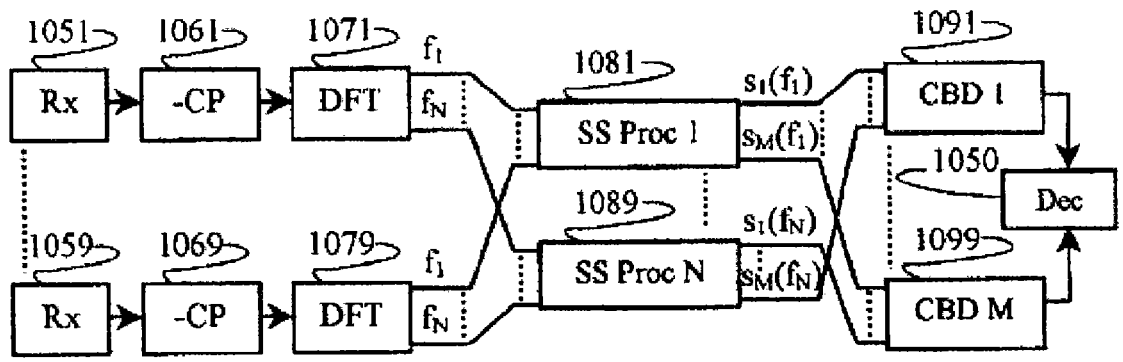
FIG. 10C illustrates a multi-element receiver of the present invention.

FIG. 10C illustrates a receiver of the present invention having components similar to those of the receiver illustrated in FIG. 10B. However, the CI decoders 1091 to 1099 of FIG. 10C are adapted to combine sub-carrier components that are mapped into a plurality of subspaces. In this case, the function of an associated transmitter (such as the transmitter shown in FIG. 10A) may provide for mapping sub-carrier components of each data symbol to a plurality of subspaces. In one aspect of the invention, the transmitter shown in FIG. 10C is configured to perform array processing, including beam forming, null steering, and/or adaptive sub-space processing. In another aspect of the invention, a spatial sub-space may correspond to a particular complex-weighted combination of transmissions from a plurality of antennas, such as array's beam pattern or sub-space pattern. Accordingly, different sub-carrier components of a DS-CDMA signal (or equivalently, a polyphase/poly-amplitude sub-carrier code) may be transmitted by different antennas or otherwise impressed onto different subspaces.

Figure 10D:
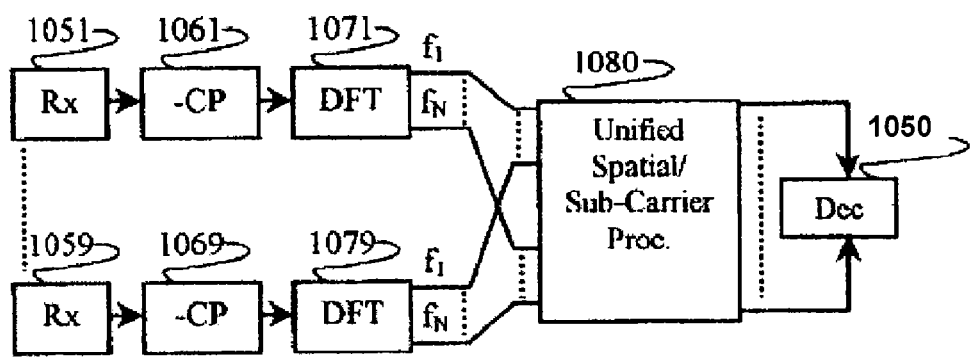
FIG. 10D illustrates a unified spatial/sub-carrier processor in a receiver array adapted to combine sub-carrier processing and spatial processing to decode and separate received signals.

FIG. 10D illustrates a receiver adapted to combine sub-carrier processing and sub-space processing operations, as indicated by a unified spatial/sub-carrier processor 1080. In one aspect of the invention, the processor 1080 performs optimal combining of sub-space/sub-carrier components to generate data-symbol values. In another aspect of the invention, the processor 1080 is configured to perform interference cancellation, such as SIC or multi-user detection. Additional aspects of the invention provide for combinations of sub-carrier and space-time processing. The receiver may be adapted to perform block decoding or sliding-window decoding.

Figure 11:
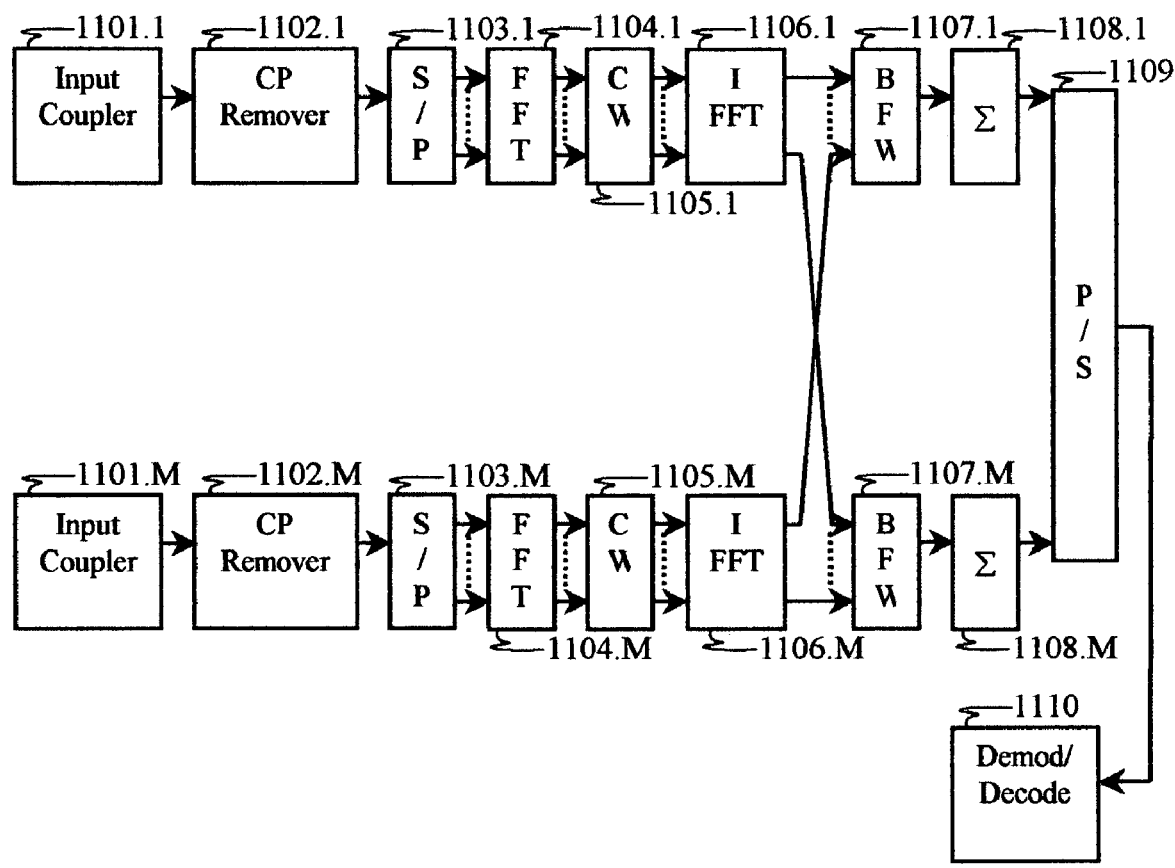
FIG. 11 illustrates a CI receiver configured as a multi-element receiver. Such receiver configurations may be employed in MIMO communications.

FIG. 11 illustrates a number M of CI receiver branches. A plurality of input couplers (e.g., antenna elements) 1101.1 to 1101.M couple signals from a communications medium (e.g., a free-space channel, a waveguide, etc.) and process the signals. The input couplers 1101.1 to 1101.M are typically adapted to perform any combination of front-end receiver-side processing, including amplification, filtering, frequency conversion, and/or A/D conversion. Other types of processing may be performed. For example, a plurality of optional guard interval (e.g., cyclic prefix) removal circuits 1102.1 to 1102.M may be incorporated in the input couplers 1101.1 to 1101.M. Similarly, each of a plurality M of serial-to-parallel converters 1103.1 to 1103.M may be included in the input couplers 1101.1 to 1101.M or in each of a plurality M of invertible-transform (e.g., FFT) circuits 1104.1 to 1104.M.

Each of the invertible-transform circuits 1104.1 to 1104.M transforms an input time-domain signal into a plurality N of frequency-domain components. The components are weighted with at least one set of CI combining weights $\alpha_m(n)$, where $m=1,\ldots,M$ and $n=1,\ldots,N$, by a plurality M of component-weighting modules 1105.1 to 1105.M. In the case where MMSE combining is employed, the weights $\alpha_m(n)$ are expressed by:

$$\alpha_m(n) = h_m^*(n)/(|N_m(n)|^2 + \sigma^2)$$

where $h_m(n)$ is the channel response for the $n^{th}$ frequency channel of the $m^{th}$ spatial subchannel, and $\sigma^2$ is the noise power. Other types and combinations of combining may be employed.

A plurality M of combiners, such as IFFTs 1106.1 to 1106.M, combine the weighted frequency-domain components to generate a plurality of time-domain signals. Time-domain outputs of the IFFTs 1106.1 to 1106.M are coupled to beam-forming modules 1107.1 to 1107.M, which are adapted to provide beam-forming weights that cancel co-channel interference in a plurality of combiners 1108.1 to 1108.M. Each combiner 1108.1 to 1108.M may include a summing circuit, an adder, an accumulator, an integrator, or any appropriate invertible transform.

The beam-forming modules 1107.1 to 1107.M and the combiners 1108.1 to 1108.M may be adapted to perform any of various types and combinations of adaptive combining. In some applications, maximal ratio combining may be employed. Other combining schemes may be employed. Combining may include interference cancellation, multi-user detection, null steering, spatial interferometry multiplexing, etc. In some cases, space-time processing may be employed. SIC, as well as other multi-level cancellation techniques, can be used. In other cases, space-frequency processing may be provided. Channel-decoding weights may be provided by either or both the component-weighting modules 1105.1 to 1105.M and the beam-forming modules 1107.1 to 1107.M. Symbols output by the combiners 1108.1 to 1108.M are converted to a data stream by a parallel-to-serial converter 1109 prior to being demodulated and decoded 1110.

Figure 12A:
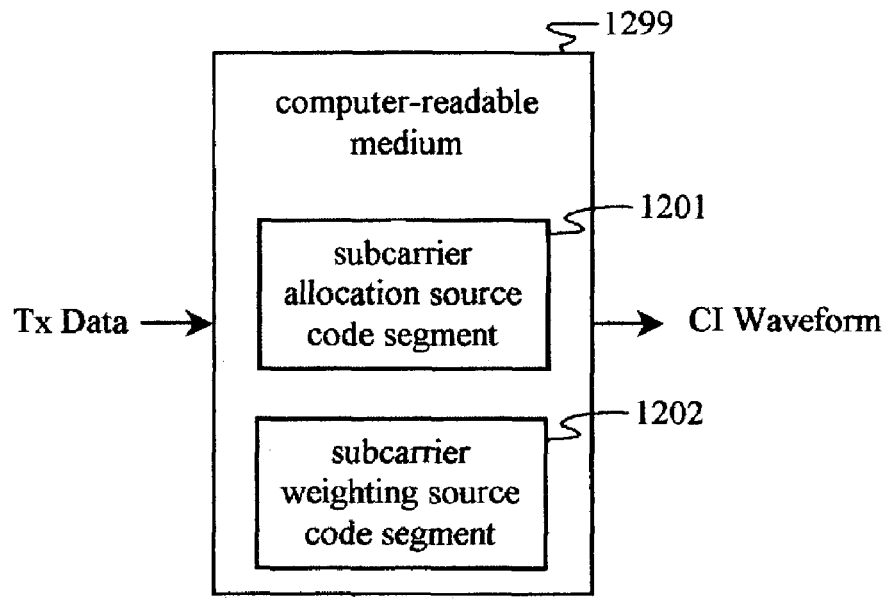
FIG. 12A illustrates basic components of CI signal generation software residing on a computer-readable medium.

FIG. 12A illustrates basic components of CI signal generation software residing on a computer-readable medium 1299. CI signal generation software is typically configured to control the function and transmission-signal output of a single carrier or multi-carrier transmitter. In some cases, a CI transmission may be characterized as a single-carrier signal in the time domain having a plurality of predetermined frequency-domain (or spectral) components.

A subcarrier allocation source code segment 1201 is adapted to generate a plurality of subcarriers allocated to at least one user or allocate a plurality of input subcarriers (not shown) to a particular user. A subcarrier weighting source code segment 1202 is adapted to provide complex weights (e.g., CI codes) to a plurality of the allocated subcarriers. The weights are configured to map one or more input data symbols into one or more phase spaces.

The computer-readable medium 1299 may include any item of manufacture adapted to store or convey software and/or firmware. The source-code segments 1201 and 1202 may reside on a physical memory storage device, such as any magnetic, electrical, or optical device adapted to store data and/or computer command instructions. The source-code segments 1201 and 1202 may be implemented as gate configurations on a programmable or integrated circuit. Other means for arranging physical devices and/or electromagnetic phenomena may be employed to convey the function of the source-code segments 1201 and. 1202. Accordingly, the computer-readable medium 1299 may include any combination of FPGAs, ASICs, transient memory, and persistent memory.

Sub-carrier allocation may include generating subcarriers, providing for receiving input subcarriers, retrieving subcarriers or superposition waveforms from memory (e.g., a look-up table), or selecting non-zero (or equivalently, zero) valued input bin weights of an invertible transform, such as a DFT. In some applications, subcarrier allocation can include pulse shaping, controlling symbol durations, and/or selecting subcarrier frequency spacing. Some frequencies may be selected or avoided relative to channel conditions, bandwidth requirements, and/or interference.

The subcarrier allocation source code segment 1201 and subcarrier weighting source code segment 1202 may be implemented in one program. Similarly, other processing operations typically performed in a communication system transmitter may be implemented in, or in addition to, the source-code segments 1201 and 1202. It should be appreciated that sub-carrier allocation, selection, and assignment can include providing subcarriers for system control and/or monitoring. Sub-carrier allocation, as described throughout the specification may include providing for pilot tones, training sequences, and/or other subcarriers allocated to other system-control functions. Sub-carrier weighting may include channel coding, source coding, spread-spectrum coding, formatting, multiple-access coding, multiplexing, encryption, modulation, and/or array processing. Systems and methods illustrated herein and described throughout the specification may be implemented as source-code segments residing on one or more computer-readable mediums.

Network control in CI communications may be adapted to enable users to share network resources (e.g., bandwidth). For example, channel resources in the form of phase spaces and/or subcarriers may be allocated to each user relative to their level of service. Bandwidth may be allocated to users relative-to any combination of individual throughput requirements, purchased level of service, and availability of bandwidth. Circuit-switched processes may be implemented with respect to sub-carrier allocations. Packet-switched processes may be implemented with respect to phase spaces. CI communications provides for the concurrent implementation of circuit switching and packet switching.

Figure 12B:
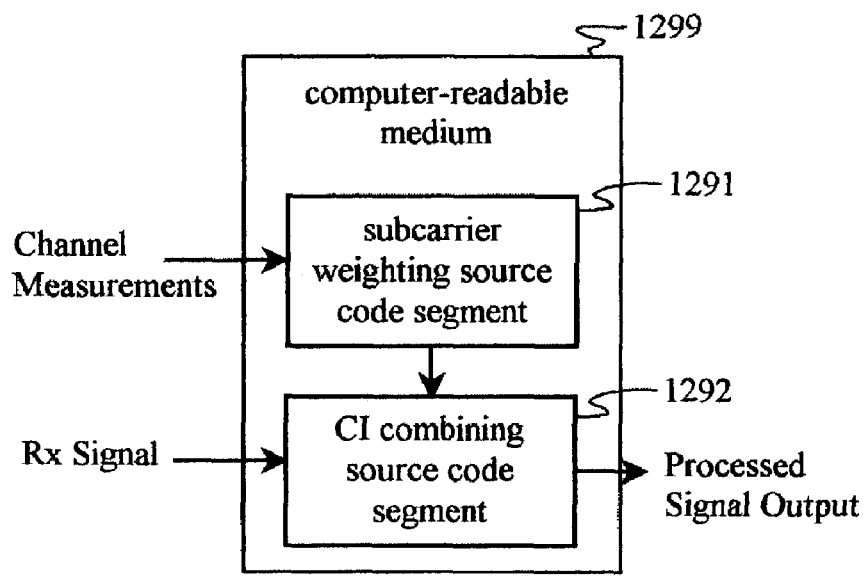
FIG. 12B illustrates basic components of CI receiver software residing on a computer-readable medium.

FIG. 12B illustrates a subcarrier weighting source code segment 1291 and a CI combining source code segment 1292 residing on a computer-readable medium 1299. The computer-readable medium is the same type of medium described with respect to medium 1299.

Source code segment 1291 is adapted to process one or more received channel measurements (such as frequency-domain or time-domain measurements) for generating a plurality of sub-carrier weights. These weights are adapted to compensate for one or more channel effects, including, but not limited to, multipath, dispersion, and co-channel interference. The weights may be adapted to provide CI decoding. The weights may be adapted relative to one or more channel and/or data-quality measurements. The weights may be configured relative to data-processing measurements, such as hard-decision, soft-decision, and/or iterative feedback decision processing. The weights are typically applied to a plurality of subcarriers, such as frequency components produced by a filter bank or an FFT. Sub-carrier weighting may include filtering, such as providing for acquiring sub-carrier frequencies allocated to at least one predetermined user. Consequently, sub-carrier weights may include both zero and non-zero values. Sub-carrier weighting may include channel decoding, source decoding, spread-spectrum decoding, formatting, multiple-access decoding, demultiplexing, decryption, array processing, and/or modulation.

Source-code segment 1292 is adapted to combine the received and weighted carriers to generate a processed signal output, which is typically a sequence of symbols. At least one type of optimal combining may be provided. Code segment 1292 is adapted to receive as input at least one received signal, such as a sequence of data symbols. The received signal may be impressed onto the weights, weighted subcarriers, or waveforms generated from one or more superpositions of the weighted subcarriers. The weights are configured to map one or more input data symbols into one or more phase spaces. In some applications, data-modulated weights may be generated in source-code segment 1291. In this case, source-code segment 1291 is adapted to process the received signal to generate at least one set of information-bearing weights.

Transceivers of the present invention can be implemented in packet data communication systems that enhance network performance by enabling adaptive-rate communications to subscribers as their respective channel conditions change. For example, the rate of a particular communication channel may be adapted by increasing or decreasing the number of subcarriers allocated to that channel. Network performance can also be enhanced by adapting the allocation of sub-carrier channels for each particular user. In this case, sub-carriers are allocated and/or de-allocated relative to channel conditions in order to avoid using subcarriers characterized by poor channel quality. Reallocation of subcarriers between multiple base stations serving a subscriber may be performed as part of a handoff procedure.

Figure 13A:
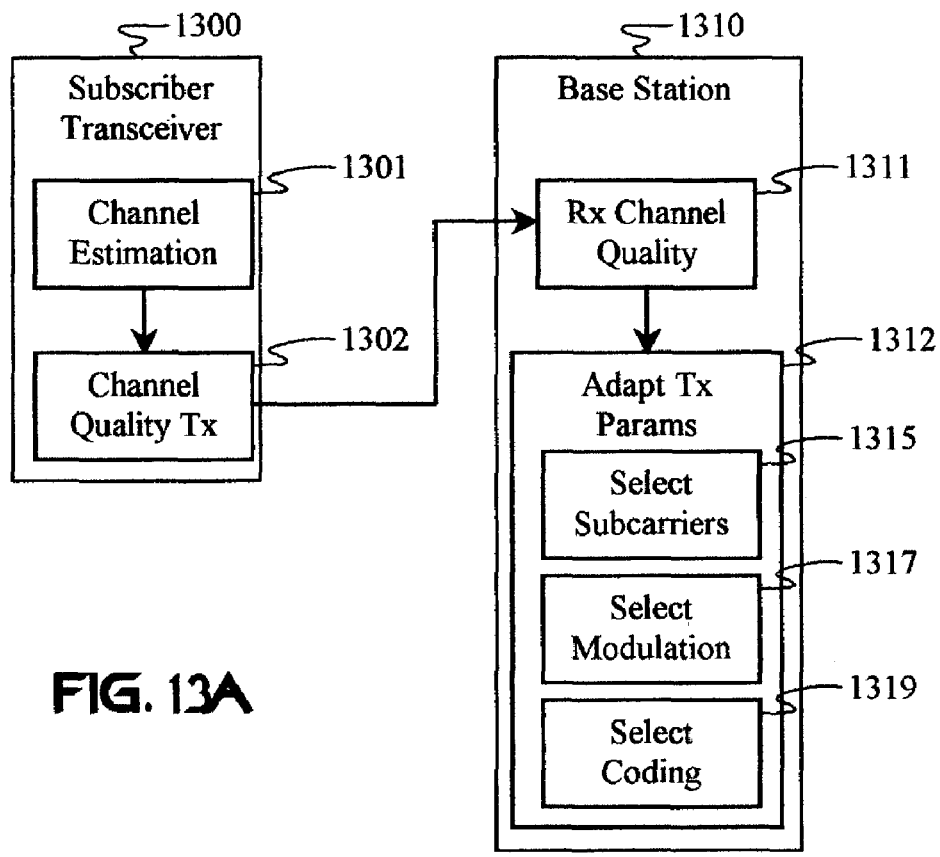
FIG. 13A illustrates network-control communications between a subscriber transceiver and a base station.

The invention may employ an adaptive-rate scheme that allows a base station to rapidly (e.g., once every few milliseconds) adapt its data rate (and, optionally, subcarriers) for each active user. FIG. 13A illustrates corresponding network-control communications between a subscriber transceiver (i.e., user, network user, mobile, or subscriber unit) 1300 and a base station 1310. Each subscriber transceiver evaluates its channel (e.g., in a channel-estimation step 1301) from at least one nearby base station 1310 using known training symbols or blind-adaptive techniques. This information (which may include derivatives of this information, such as maximum data rate) is conveyed to the network, such as in a channel quality evaluation transmission step 1302. This allows a base station to serve each user at the highest data rate that the channel conditions permit.

The base station 1310 is adapted to receive the channel quality assessments from each subscriber transceiver 1300, as indicated by a reception step 1311. The base station 1310 (possibly in cooperation with other base stations or a network controller) adapts transmission parameters 1312 that control the transmission of information to the subscriber transceivers. The base station 1310 selects subcarriers 1315 for transmission to each subscriber, such as subscriber transceiver 1300. The base station 1310 selects a suitable modulation scheme (e.g., QPSK, 8-PSK, 16-QAM, 64-QAM) 1317 for each transmission based on the corresponding channel conditions. Similarly, different channel-coding schemes, including different coding rates, may be selected 1319 in accordance with the channel conditions. Adaptive-rate operation may further include an ARQ scheme that provides additional robustness against inaccuracies in the data-rate estimation, especially in situations that involve high mobility.

In forward-link soft-handoffs, multiple base stations may transmit the same data frame, allowing a subscriber transceiver to combine the received signals to enhance performance and link reliability in the presence of fading. However, conventional soft handoff requires that multiple base stations use additional spectrum resources for transmitting the same frame. This can reduce system capacity. In addition to using excessive spectrum, forward link soft handoffs in packet data systems also shift packet scheduling from the base station to a network controller. This introduces delays and significantly reduces the packet scheduling efficiency.

Figure 13B:
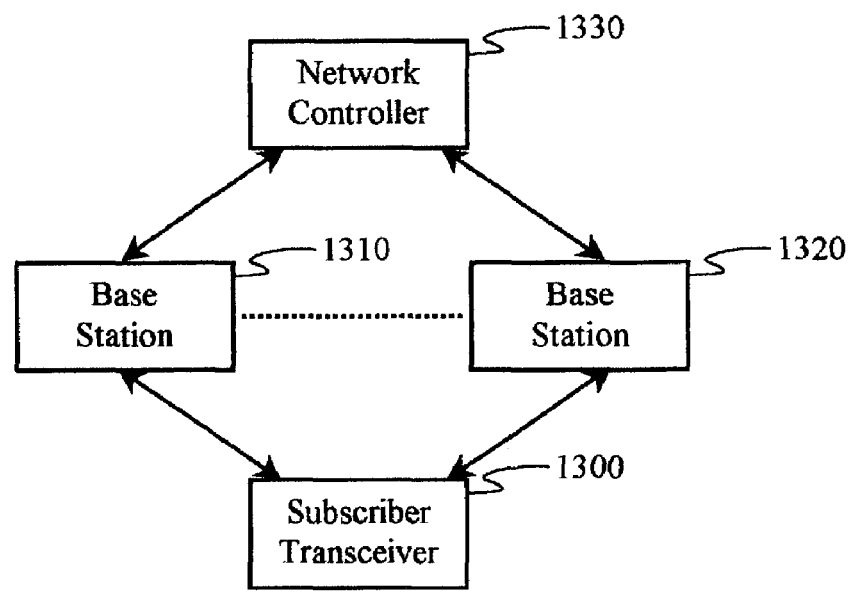
FIG. 13B illustrates a geographical configuration between a subscriber transceiver and a plurality of base stations serving the subscriber. Multiple base stations may serve a given subscriber, such as during a soft handoff.

FIG. 13B represents a geographical configuration between a subscriber transceiver 1300 and a plurality of base stations 1310 and 1320, such as during a soft handoff. In one aspect of the invention, CI transceivers employed in the base stations 1310 and 1320 and the subscriber unit 1300 are configured to process redundant data transmissions from the base stations 1310 and 1320. In another aspect of the invention, the transceiver 1300 selects which base station from which it will receive data. This improves bandwidth efficiency. In another aspect of the invention, different data transmissions from the base stations 1310 and 1320 to the transceiver 1300 are provided, also improving bandwidth efficiency. In yet another aspect of the invention, the transceiver 1300 is configured to select which subcarriers to use relative to the different base stations 1310 and 1320, thus providing for optimal bandwidth efficiency. In preferred embodiments of the invention, data symbols are spread across all of the subcarriers or subsets of subcarriers, even when the subcarriers are transmitted from different base stations. Alternatively, each data symbol is spread across subcarriers allocated to only one base station.

Well-known radio selection diversity techniques may be employed by the invention. For example, each active subscriber transceiver (such as transceiver 1300) measures the channel quality relative to all nearby base stations 1310 and 1320 and then requests the base station 1310 or 1320 providing the best channel quality. This allows the network to serve the subscriber 1300 from the base station 1310 or 1320 that can provide the highest data rate. The base stations 1310 and 1320 then coordinate with a network controller 1330 to ensure that packets are correctly delivered to the serving base station 1310 or 1320. The base station 1310 and/or 1320 schedules the packets for transmission at the data rate selected by the subscriber unit 1300.

In a particular aspect of the invention, the subscriber unit 1300 receives transmitted subcarriers from a plurality of base stations (such as base stations 1310 and 1320) wherein each base station 1310 and 1320 transmits data to the subscriber unit 1300 on a different set of subcarriers. This mode of transmission may be employed in a soft hand-off.

In one aspect of the invention, the transceiver 1300 measures the channel quality of each of a plurality of subcarriers (or sub-carrier groups) relative to all nearby base stations 1310 and 1320. The user transceiver 1300 then requests optimal base station/sub-carrier combinations providing the best channel quality. The base stations 1310 and 1320 coordinate with the network controller 1330 to ensure that packets are correctly delivered to the serving base stations 1310 and 1320. Each selected base station 1310 and 1320 schedules the packets for transmission on the subcarriers selected by the transceiver 1300.

FIG. 13B is described with respect to an exemplary handoff of the invention. The subscriber unit 1300 is provided with a connection to base station 1310. The connection carries control and data information on a plurality of subcarriers in both uplink and downlink directions. As the subscriber 1300 moves closer to base station 1320, the subscriber 1300 may add base station 1320 as a supplemental and possible hand-off candidate. Therefore, the subscriber 1300 establishes and maintains two connections on different sub-channel sets, one with base station 1310 and another with base station 1320.

In accordance with one aspect of the present invention, the two connections are independently operated. For this exemplary embodiment, in the downlink, different spreading symbols corresponding to common data packets (and optionally, control information) are received from each of the base stations 1310 and 1320. In some instances, different control information may be received from different base stations, such as base stations 1310 and 1320. The received symbols are combined and despread to recover the transmitted data packets, which may be part of a computer file or message (e.g., voice E-mail or text message). In the uplink, control information is transmitted to both base stations 1310 and 1320. The control information transmitted to different base stations can be different, particularly if the base stations 1310 and 1320 are not synchronized. In some embodiments, different symbol transmission start times are used by each base station 1310 and 1320, requiring different symbol timing synchronization to be performed on received signals.

According to an aspect of the present invention, the subscriber unit 1300 may include hardware and software for receiving a set of optimum system-access parameters (which may be determined based on the geographical position of the subscriber unit 1300 and the channel conditions) for controlling the performance of the communication link. Controlling the performance may include allocating or re-allocating subcarriers and effectuating a soft handoff from a first base station (e.g., base station 1310) to a second base station (e.g., base station 1320).

According to another aspect of the present invention, each base station 1310 and 1320 may include hardware and software for transmitting a set of optimum system-access parameters, which may be determined based on channel conditions and the current position of the subscriber unit 1300, for controlling the performance of the link(s) to the subscriber unit 1300. Controlling the performance may include effectuating an initial open-loop power of the subcarriers, persistence delay, power increment, randomization delay, back off time, and acknowledgement timeout. These parameters may be used by the subscriber unit 1300 to access the network and may be sent as part of an access parameters message on common or dedicated signaling channels.

According to another aspect of the present invention, a method for updating a current set of system parameters in a communications system may include determining the current geographical location of each subscriber unit (such as subscriber unit 1300), characterizing channel conditions for each of a predetermined set of sub-carrier/base station combinations, determining a set of optimum parameters based on the location and channel conditions of the subscriber unit 1300, and updating the current set of parameters with a set of optimum parameters. The method may be applied to optimizing parameters that may be involved in sub-carrier access and/or handoff.

In conventional soft handoff, the mobile station receives essentially identical traffic data from at least two base transceiver stations. Soft handoff typically employs a make-before-break protocol in which a first link is maintained until a second link is established. Thus, there is a time during which the first link and second link are maintained simultaneously. The base transceiver stations involved in the soft handoff process may be located in two different cell sites or the same cell site, and they typically operate over a common carrier frequency. A soft handoff may be performed between two or more sectors in a cell served by a given base station.

In order to accomplish soft handoff, there needs to be a connection between the controllers or the base transceiver stations involved in the soft handoff process. In hard handoff, the resources in one base station transceiver are released while new communication resources in a new base station are allocated to the mobile station. Generally, hard handoff occurs between cell sites that are operating over two different frequencies, or between two different systems.

Hand off in the present invention is achieved by reallocating subcarriers in a given communication link between a subscriber unit (such as subscriber 1300) and a plurality of base-station transceivers (such as base stations 1310 and 1320). This reallocation is implemented to optimize performance on each subcarrier. Thus, the hand off is typically achieved via sub-channel optimization. Hand off in the present invention resembles conventional hard handoff on a microscopic (i.e., sub-carrier) scale. For example, different frequencies or frequency sets may be employed relative to each base station transceiver 1310 and 1320. As sub-channel resources (i.e., subcarriers) are released by a particular base station (such as base stations 1310 or 1320), new sub-channel resources are allocated by at least one other base station (such as base stations 1320 or 1310).

Hand off in the present invention resembles soft handoff on a macroscopic (i.e., link) scale, even though different frequencies (subcarriers) are allocated by different base stations 1310 and 1320. For example, similar data symbols or bits are conveyed on subcarriers on links between the subscriber unit 1300 and the plurality of base stations 1310 to 1320. However, the data symbols or bits are spread across chip sets (such as via spread spectrum, multiple access, and/or channel coding) which are conveyed on different subcarriers. Various types of channel coding, such as block or convolutional coding, may be employed for spreading data across the subcarriers.

The base stations 1310 and 1320 have both uplink and downlink connections with subscriber unit 1300 that provide control and data flows. Different types of link connections may be employed. In the case where the base stations 1310 and 1320 are not synchronized, the subscriber unit 1300 maintains separate synchronization loops (not shown). Thus, frequency and timing corrections may be carried out independently. While synchronization loops (not shown) function independently, they may share some common hardware, e.g., analog receiver circuitry, used to receive signals corresponding to different connections, whereas independent digital processing may be used to perform all or a portion of the timing control implemented in each of the synchronization loops (not shown).

The subscriber unit 1300 maintains an active uplink for each base station 1310 and 1320 with which it communicates. The uplinks are used to transmit control information, such as power control and link-layer acknowledgment, to each base station 1310 and 1320. In accordance with the invention, different control information may be transmitted to each of the base stations 1310 and 1320.

Methods of the invention can be inferred from the descriptions of handoff strategies and interactions between subscriber transceivers and base stations described herein. In particular, the invention includes a method of implementing a handoff between base stations of a communications system, the method comprising: communicating with a first base station; establishing a connection with a second base station; and transmitting a first partial set of modulated code symbols on a first set of subcarriers to the first base station and a second partial set of modulated code symbols on a second set of subcarriers to the second base station, wherein a combining and decoding of the first and second sets of modulated code symbols produces a communication signal.

The first and second partial sets of code symbols combine to produce a full set of code symbols from which at least one data symbol can be decoded. It should be appreciated that when N base stations provide transmissions to a particular subscriber, there are up to N associated partial sets of code symbols upon which one or more data symbols are modulated.

The invention also includes a method for implementing a handoff between base stations of a communications system, the method comprising: communicating with a first base station; establishing a connection with a second base station; and transmitting a first set of modulated code symbols of a portion of at least one spreading code to the first base station and a second set of modulated code symbols of a complementary portion of the at least one spreading code to the second base station. In this case, the portion and complementary portion of a spreading code can be combined to produce the full spreading code (i.e., all of the code chips of a particular spreading code).

The invention further includes a method for implementing a communications system, the method comprising: providing a plurality of base stations for interacting with a mobile communications device (i.e., a subscriber unit); operating at least a first and second base station in the plurality of base stations to receive, in parallel, similar data spread on different partial codes from the mobile communications device to be transmitted over a wired asynchronous communications network; and operating the first and second base stations to combine and decode the data spread on different partial codes and supply the received data to the wired asynchronous network.

These methods may further include monitoring the quality of the connections with the first and second base stations, and ceasing to transmit data on the lower quality connection. Similarly, transmissions on lower quality subcarriers may be ceased and/or transferred to at least one other base station. Channel quality measurements for a given subcarrier or set of subcarriers may be made with respect to a plurality of base stations.

The methods and systems of the present invention are applicable to multi-carrier signaling (such as coded OFDM, spread OFDM, and MC-CDMA) and single-carrier signaling (such as DSSS, DS-CDMA, and TDMA), which can be implemented with multi-carrier synthesis and analysis. Accordingly, an application of the present invention provides for multiple base stations to support (and/or handoff) a subscriber in a DS-CDMA system. Another application of the invention enables a subscriber to process different types of signals (e.g., DS-CDMA and TDMA) from different networks (e.g., IS-95 and GSM) to facilitate a make-before-break (e.g., soft) handoff between base stations of the different networks. In this case, a subscriber performs subcarrier selection and decoding to separate and process the different signals.

Figure 14:
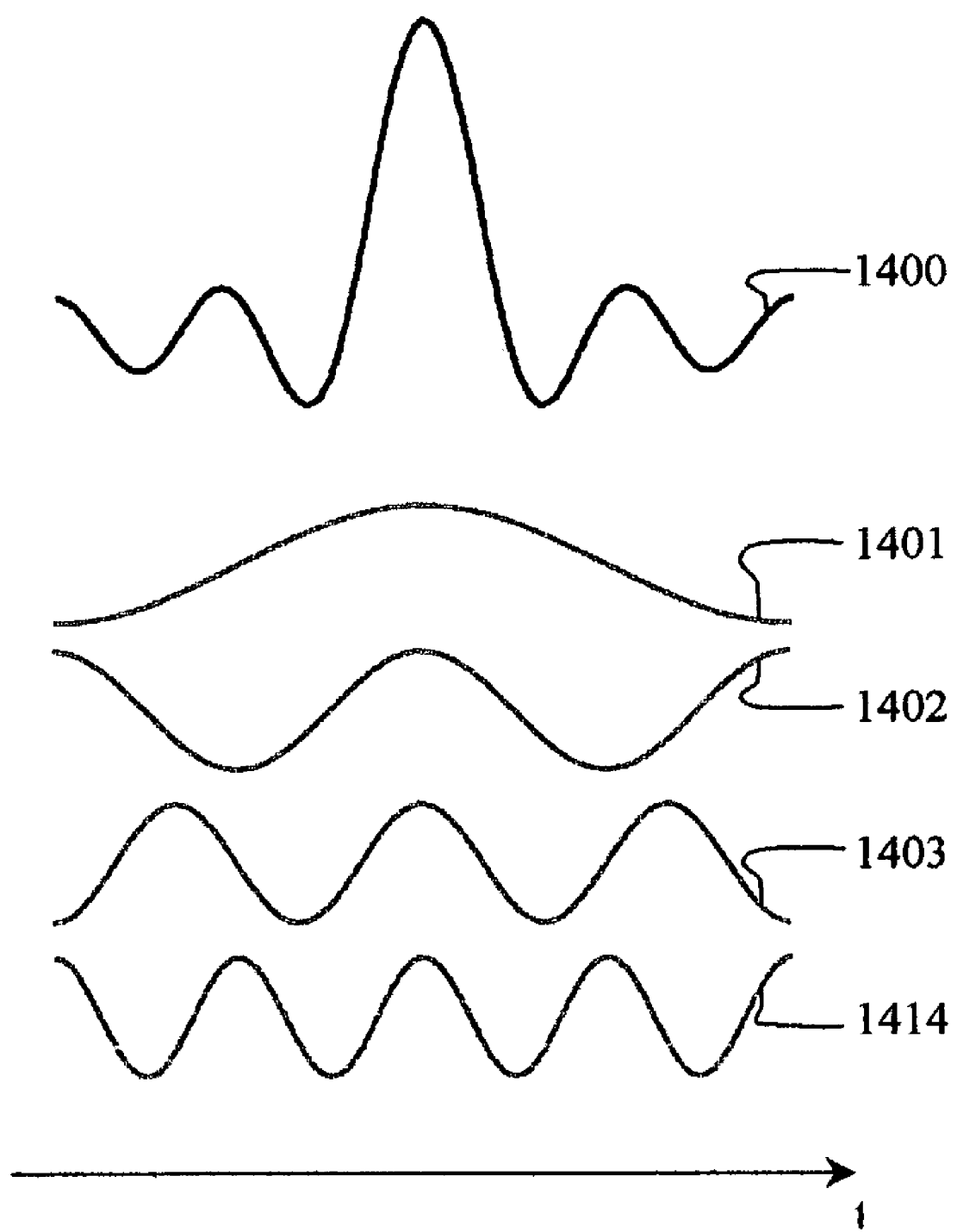
FIG. 14 illustrates multiple spread-spectrum coded subcarrier sets received from a plurality of base stations that combine at a receiver to convey a predetermined data stream.

FIG. 14 illustrates how multiple spread-spectrum coded (e.g., CI) sub-carrier sets transmitted by different base stations (such as base stations 1310 and 1320) combine at a receiver (such as transceiver 1300) to convey a predetermined data stream. A data bit of the data stream is represented by a pulse waveform 1400. Spread-spectrum coding (such as CI coding) provides a first set of M subcarriers 1401, 1402, and 1403 with M code symbols representing N coded data symbols, where M<N. The M code symbols represent a partial set (or portion) of N code symbols. A second set of N-M subcarriers 1414 is modulated with N-M code symbols also representing N data symbols. The N-M code symbols represent a second partial set (and complementary portion) of the total N code symbols. The two sets of subcarriers are processed together to combine all N code symbols in order to decode all N data symbols.

It should be noted that more than two base stations may be employed in a communication link with a subscriber. It should also be noted that the number of subcarriers allocated to a particular transceiver may be greater or less than the number N of data symbols that may be conveyed in a block or sliding-window transmission. Processing may take the form of any combination of decoding and interference cancellation. Processing may combine decoding and demodulation into a unified process that may optionally employ soft-decision processing and feedback. Channel coding may also provide an effective spreading. According, a plurality of channel code symbols that are representative of at least one common data symbol or bit may be distributed across multiple subcarriers transmitted by different base stations.

The base stations divide the available forward link throughput among all active subscribers using some one or more types of multiplexing. To optimize multiplexing efficiency, the system may use a packet-based time-division multiplexing scheme, a packet-based frequency-division multiplexing scheme, or some combination thereof. When CI coding is employed in the frequency domain, CI code division multiplexing can resemble time-division multiplexing. A time-division scheduler in the base station may be employed to determine the sequence in which packets are transmitted. In one aspect of the invention, each base station transmits short packets to the users by employing all available spectrum resources (e.g., power and subcarriers, or CI code space) and at the maximum data rate that each recipient's channel conditions allow. In another aspect of the invention, a frequency-division scheduler in a base station dynamically allocates subcarriers to users based on channel conditions and/or demand for data.

A preferred embodiment of the invention provides for a scheduler adapted to schedule packets based on each user's channel quality. This improves the multiplexing efficiency significantly over other scheduling routines, such as round robin scheduling. By serving active subscribers when their channel quality is relatively good, the effective throughput provided to each active subscriber is significantly improved. This improvement is typically referred to as the multi-user diversity.

Even though the reverse link is relatively less important in Internet applications, it is desirable to optimize efficiencies on the reverse link in order to effectively support applications, such as uploading e-mail attachments and IP-based video conferencing.

The reverse link in the exemplary embodiments of the invention employs CI-based signaling, such as CI-based CDMA or CI-OFDM. CI-based transmission protocols have excellent bandwidth efficiencies and greatly simplify the subscriber terminal operation. CI is very attractive for the reverse link in packet data systems because it naturally supports statistical multiplexing and provides a low-delay means for carrying TCP acknowledgments. The granularity enabled by subcarrier selection in CI systems enhances adaptability to a wide range of transmission requirements and data rates. This adaptive rate control enables the base stations to control the data rate of the terminals on individual and global scales.

In packet data, a connection may be very short and may have to be established and broken several times during a packet data session. For example, in a web browsing session, it is desirable to break a connection between page downloads in order to provide network access for other users. An important feature of a packet-based CI system is its ability to quickly establish and break connections. Terminals can initiate connections by sending a very short connection request message to the base station. It is advantageous to provide Fast Re-Connect capability that allows a network to quickly re-establish a connection with a subscriber.

All publications and patent applications mentioned in this specification are herein incorporated by reference to the same extent as if each individual publication or patent application was specifically and individually incorporated by reference.

Various embodiments of the invention may include variations in system configurations and the order of steps in which methods are provided. In many cases, multiple steps and/or multiple components may be consolidated.

The method and system embodiments described herein merely illustrate the principles of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying the principles of the invention. Similarly, it should be appreciated that any flow charts, flow diagrams, signal diagrams, system diagrams, codes, and the like represent various processes which may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function or software in any form, including, therefore, firmware, microcode or the like, combined with appropriate circuitry for executing that software to perform the function. The invention as defined herein resides in the fact that the functionalities provided by the various recited means are combined and brought together in the manner which the operational descriptions call for. Applicant regards any means which can provide those functionalities as equivalent as those shown herein.

I claim:

1. A multi-carrier communications transmitter including:
   a sub-carrier allocator adapted to allocate at least one set of subcarriers for communication,
   a pulse generator to be coupled to the sub-carrier allocator, the pulse generator adapted to generate a plurality of pulses having spectral components corresponding to the at least one set of subcarriers, wherein the pulse generator comprises:
      a subcarrier weighting module to impress at least one set of complex weights generated from at least one carrier interferometry code onto the at least one set of subcarriers to generate a plurality of weighted subcarriers; and
      a sub-carrier combiner adapted to combine the weighted subcarriers to produce the plurality of pulses;
   a modulator to be coupled to at least one of the sub-carrier allocator and the pulse generator, the modulator adapted to impress at least one data symbol onto the plurality of pulses, and
   a sequential pulse positioner to be coupled to at least one of the sub-carrier allocator, the pulse generator, and the modulator, the sequential pulse positioner to sequentially position the plurality of pulses.

2. The multi-carrier transmitter recited in claim 1, further including a coder to be coupled to the modulator, the coder adapted to encode the at least one data symbol with at least one code selected from a set of codes consisting of a spread-spectrum code, a multiple-access code, a spectrum-shaping code, a channel code, and an encryption code.

3. The multi-carrier transmitter recited in claim 1, further including a cyclic-prefix prepender to be coupled to the pulse generator or the sequential pulse positioner, the cyclic-prefix prepender adapted to provide the plurality of pulses with at least one of a set of guard intervals, the set consisting of a cyclic prefix, a cyclic postfix, and a sequence of zeros.

4. The multi-carrier transmitter recited in claim 1, wherein the pulse generator is adapted to combine the at least one set of subcarriers to generate the plurality of pulses.

5. The multi-carrier transmitter recited in claim 1, wherein at least one of the sub-carrier allocator, the pulse generator, the modulator, or the sequential pulse positioner is adapted to provide for multiple access with respect to at least one multiple-access technique.

6. The multi-carrier transmitter recited in claim 1, wherein the sub-carrier allocator is configured to allocate the at least one set of subcarriers with respect to at least one of a set of conditions consisting of availability of spectrum, multipath fading, interference, quality of service, link priority, throughput requirements of at least one user, network load, and geographical location of at least one user.

7. The multi-carrier transmitter recited in claim 1, wherein the sequential pulse positioner is configured to position the plurality of pulses to provide at least one of a set of pulse sequences, the set of pulse sequences consisting of an orthogonally positioned sequence of modulated pulses and a pseudo-orthogonally positioned sequence of modulated pulses.

8. The multi-carrier transmitter recited in claim 1 wherein the pulse generator is adapted to shape the plurality of pulses.

9. The multi-carrier transmitter recited in claim 1, wherein the pulse generator is adapted to perform at least one spectrum-shaping function selected from the group consisting of weighting the at least one set of subcarriers and selecting a subset of the at least one set of subcarriers.

10. A method of transmitting data symbols, comprising:
   generating at least one set of weighted, orthogonal sub-carriers spaced apart in frequency, said generating including weighting the sub-carriers using complex sub-carrier weights generated from one or more carrier interferometry (CI) codes; and
   modulating the sub-carriers by sequential, overlapping data symbols to obtain modulated sub-carriers,
   wherein the data symbols are mapped to a plurality of pulse positions within a sequence of modulated pulses with spectral components characterized by the sub-carriers.

11. The method of claim 10, wherein said generating comprises:
   generating time-domain values corresponding to said sub-carriers; and
   converting the time-domain values into frequency-domain values.

12. The method of claim 11, wherein said converting comprises performing a fast Fourier transform (FFT).

13. The method of claim 11, wherein said generating further comprises:
   selecting a subset of a set of possible sub-carriers.

14. The method of claim 11, wherein said generating further comprises:
   performing a frequency-domain to time-domain conversion of weighted frequency-domain values.

* * * * *